(12) United States Patent
Teyeb et al.

(10) Patent No.: US 9,042,918 B2
(45) Date of Patent: May 26, 2015

(54) USING FINGERPRINTS IN PROXIMITY DETECTION OF WIRELESS DEVICES

(75) Inventors: Oumer Teyeb, Stockholm (SE); Johan Rune, Lidingö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 234 days.

(21) Appl. No.: 13/428,886

(22) Filed: Mar. 23, 2012

(65) Prior Publication Data

US 2013/0084892 A1    Apr. 4, 2013

Related U.S. Application Data

(60) Provisional application No. 61/542,616, filed on Oct. 3, 2011, provisional application No. 61/608,807, filed on Mar. 9, 2012.

(51) Int. Cl.
| | |
|---|---|
| *H04W 64/00* | (2009.01) |
| *H04W 4/02* | (2009.01) |
| *H04W 48/16* | (2009.01) |
| *H04W 48/04* | (2009.01) |

(52) U.S. Cl.
CPC .............. *H04W 4/023* (2013.01); *H04W 48/04* (2013.01); *H04W 48/16* (2013.01)

(58) Field of Classification Search
CPC .... H04W 24/10; H04W 48/20; H04W 84/045
USPC .......................... 455/456.6, 435.1, 436, 67.14; 370/328–338
See application file for complete search history.

(56) References Cited

U.S. PATENT DOCUMENTS

| | | | |
|---|---|---|---|
| 2007/0019586 A1 | 1/2007 | Nanda et al. | |
| 2010/0178916 A1* | 7/2010 | Jamadagni | 455/434 |
| 2010/0323633 A1* | 12/2010 | Pani et al. | 455/67.14 |
| 2012/0170560 A1* | 7/2012 | Han et al. | 370/338 |

FOREIGN PATENT DOCUMENTS

| | | |
|---|---|---|
| EP | 2328375 A1 | 6/2011 |
| WO | 2008131591 A1 | 11/2008 |
| WO | 2010110706 A1 | 9/2010 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.5.0, Sep. 2011, 1-194.

3GPP, "3rd Generation Partnership Project; Technical Specification Group Radio Access Network; Evolved Universal Terrestrial Radio Access (E-UTRA); Physical Channels and Modulation (Release 10)", 3GPP TS 36.211 V10.3.0, Sep. 2011, 1-103.

(Continued)

*Primary Examiner* — Chuong A Ngo
(74) *Attorney, Agent, or Firm* — Murphy, Bilak & Homiller, PLLC

(57) ABSTRACT

A method in a network node for enabling proximity detection is presented. The network node is comprised in a wireless communications network and serves a wireless device. According to the method, the network node obtains a fingerprint of a CSG cell, or of an inter-frequency cell. The network node then transmits the fingerprint to the wireless device, thereby enabling the wireless device to determine when it is in the proximity of the cell.

45 Claims, 16 Drawing Sheets

(56) References Cited

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.3.0, Sep. 2011, 1-296.

3GPP, "3rd Generation Partnership Project; Technical Specification Group Radio Access Network; Evolved Universal Terrestrial Radio Access Network (E-UTRAN); Self-configuring and self-optimizing network (SON) use cases and solutions (Release 9)", 3GPP TR 36.902 V9.3.1, Mar. 2011, 1-21.

Zhang, Jie et al., "Femtocells: Technologies and Deployment", Wiley Online Library Available Online at http://onlinelibrary.wiley.com/book/10.1002/9780470686812, Nov. 3, 2009.

* cited by examiner

USING FINGERPRINTS IN PROXIMITY DETECTION OF WIRELESS DEVICES

RELATED APPLICATIONS

This application claims priority to U.S. Provisional Patent Application Ser. No. 61/542,616, filed on Oct. 3, 2011, and U.S. Provisional Patent Application Ser. No. 61/608,807, filed on Mar. 9, 2012.

TECHNICAL FIELD

The present invention relates generally to methods and arrangements for proximity detection. In particular, it relates to detecting proximity of a wireless device to a cell by means of fingerprinting.

BACKGROUND

In cellular networks, it has been estimated that ⅔ of the voice calls and over 90% of data service utilization is performed indoors. However, in an indoor environment operators typically find it very difficult to provide good coverage and sufficient capacity, mainly due to the unfavorable indoor propagation conditions. Densification of macro base stations, e.g. LTE enhanced NodeBs (eNBs) that can overcome the indoor penetration loss may solve the problem to some extent. However, this is very expensive and sooner or later interference between the high power base stations is going to make optimizing and running such a dense macro network very challenging. Moreover, wireless terminals, e.g. user equipments (UEs), still suffer from battery drain as they also have to compensate for the indoor penetration loss in the uplink (UL) direction. Low power nodes (LPN), which can either be stand alone pico base stations (simply known as picos) or home base stations (HeNBs or HNBs, also known as femto cell base stations or simply femtos) is one of the solutions proposed for solving the indoor coverage and capacity problem. A pico base station is the same as a macro eNB apart from its smaller coverage area, while HeNB/HNBs have some architectural differences from macro eNB.

"Low power node" in the present context refers to a node having a lower maximum output power compared to a macro base station. Due to their comparatively smaller coverage area, low power nodes may be deployed within the macro cells as an additional layer, providing "hot spots" of additional coverage where needed. The terms "local area base station" or "local area node" may be used to refer to an LPN, in particular a pico base station. Home base stations may also be viewed as a special type of local area node. In contrast, a macro base station may be referred to as a "wide area" base station.

3GPP TS 36.104, version 10.5.0, table 6.2-1, which is included below, provides example output power levels for different types of base stations. However, it should be realized that the exact output power may vary, and the examples should thus be viewed as non-limiting.

TABLE 6.2-1

| Base Station rated output power | |
|---|---|
| BS class | PRAT |
| Wide Area BS | - (note) |
| Local Area BS | ≤+24 dBm (for one transmit antenna port) |
| | ≤+21 dBm (for two transmit antenna ports) |

TABLE 6.2-1-continued

| Base Station rated output power | |
|---|---|
| BS class | PRAT |
| Home BS | ≤+18 dBm (for four transmit antenna ports) |
| | <+15 dBm (for eight transmit antenna ports) |
| | ≤+20 dBm (for one transmit antenna port) |
| | ≤+17 dBm (for two transmit antenna ports) |
| | ≤+14 dBm (for four transmit antenna ports) |
| | <+11 dBm (for eight transmit antenna ports) |

NOTE:
There is no upper limit for the rated output power of the Wide Area Base Station.

Some of the benefits that LPNs are expected to offer are:
Offload of traffic from macro eNBs, and hence an increase in macro layer capacity.
Guaranteed coverage and high capacity transmission at home.
UE battery savings due to low UL transmission power requirements.
Seamless connectivity when UEs move in and out of homes, apartment and office buildings, etc. Although cellular to WiFi handover is possible, all currently existing solutions are too slow and complex to realize seamless handover.

Femto cells have been defined in the 3rd Generation Partnership Project (3GPP) Release 8, for both Universal Mobile Telecommunication System (UMTS) and Evolved Packet System (EPS) technologies. EPS comprises the Long Term Evolution (LTE). UMTS femtos are referred to as HNBs while EPS/LTE femtos are called HeNBs. Throughout this disclosure, the notation H(e)NB is used to denote both HNBs and HeNBs.

A HeNB is an LPN, typically located at a residential home or office, which can provide connectivity to cellular users over the Internet, for example, using the user's dedicated Digital Subscriber Line (DSL). HeNB are generally physically small, with similar dimensions as a WiFi access point. FIG. 1 shows a typical deployment scenario of HeNBs, where eNBs are providing coverage mainly for outdoor UEs and the HeNBs offload some of the indoor traffic. Since H(e)NBs are low cost base stations that may be user deployed, it is important to have a flexible access control mechanism, considering both performance and security aspects. Currently, three access modes are defined in 3GPP:

Closed access: Only a subset of UEs are allowed to connect to the H(e)NB. This access mode is also known as Closed Subscriber Group (CSG).
Open access: This access mode is similar to a normal eNB access mode, i.e. all customers of the operator are allowed to use the H(e)NB.
Hybrid access: This is a mixture of CSG and open access, where any user is allowed to connect to the H(e)NB, but the UEs that are members of the CSG of the H(e)NB might get priority or different charging rates as compared with non-CSG UEs.

On the other hand, picos are always expected to be in open access mode like macro eNBs.

Throughout this disclosure, the expression "CSG cell" refers to a cell being served by a base station in closed access mode. The base station is typically a H(e)NB, however it is not excluded that other types of base stations could operate in closed access mode and serve CSG cells.

In EPS/LTE, HeNBs broadcast their access mode in the System Information Block Type 1 (SIB1), using the CSG-Indication and CSG ID parameters. CSG-Indication is set to TRUE only in the case of closed HeNBs, and CSG ID is only present in closed and hybrid HeNBs. A list of CSG IDs that the user has access to is stored in the UE in a list called CSG white list, i.e. UEs can not access closed HeNB cells that have a CSG ID that is not included in the UE's CSG white list. When accessing a hybrid access HeNB, the presence or absence of the CSG ID in the CSG white list determines whether the UE is given preferential treatment, such as higher priority and/or lower charging rates, or not.

Only outbound handover, i.e. HeNB-to-eNB, was supported in Release 8, but starting with Release 9, inbound handover from eNB to HeNB is also supported. Performing this procedure in the same way as an all-macro deployment can be very expensive in terms of the time required for the UE to perform neighbor cell measurements and also the overhead of measurement reports. This is because, due to the anticipated dense deployment of the HeNBs, a UE might be able to detect a large number of HeNB cells. Some of these, often even a large majority of them, might not be relevant to the UE if they are CSG cells in which the UE has no membership.

Thus, the concept of proximity reporting was introduced in release 9, where the UE can indicate to the serving eNB whenever it is entering or leaving the proximity of cells with CSG IDs that the UE has in its white list. The proximity detection, also known as Autonomous Search Function (ASF), is not standardized and is left for UE implementation. ASF can be based, for example, on location information, e.g. GPS location indicating that the UE is approaching home, or some other kind of fingerprinting where the UE maps the location based on the Physical Cell Identity (PCI) of the neighboring cells of its HeNB. The fingerprinting procedure, whether it is based on location or neighbor cell information, may be configured (i.e. the location or neighbor cell PCIs are learnt) the first time the user connects to a HeNB and may also be refined (e.g. adding and/or removing neighbor cell PCIs), or verified, at subsequent occasions when the UE connects to the HeNB.

The UE sends the proximity indication later on to its serving macro cell eNB whenever the current location or neighbor cell PCIs match(es) the fingerprint. The UEs can be disabled from measuring the CSG cells until they detect that they are nearby an allowed CSG cell and send a proximity indication. This can be done by configuring them not to measure on the frequency used by the HeNBs in the case of inter-frequency deployment. In the case of intra-frequency deployment, the UEs can be configured to put the PCIs used by CSG cells in their black cell list. A black cell list consists of cells which are not to be considered as potential handover target cells and which the UE consequently should not include in measurements and measurement reports.

When the serving cell receives a proximity indication from a UE, it can re-enable UE measurements of the CSG cells. For example, the serving cell may enable measurements at the HeNB frequency or put the PCIs of the CSG cells in the white list.

The procedure for inbound mobility towards a closed/hybrid HeNB is illustrated in FIG. 2 (see also 3GPP TS 36.300, version 10.6.0, section 10.5.1). The following five basic steps can be identified:

A. Proximity configuration/reporting: The source eNB configures the UE whether to send proximity indication reports or not, and a UE configured to report proximity will do so accordingly whenever it detects that it is approaching a HeNB whose CSG ID is in its CSG white list. To reduce the number of reports, a UE is limited to send not more than one proximity indication within 5 sec (see 3GPP TS 36.331, version 10.5.0).

B. Handover measurement/reporting: The source eNB configures the UE with relevant measurement configuration (such as measurement gaps), if such configuration is not already present. The UE includes the PCI in the measurement reports.

C. System Information acquisition: The source eNB configures the UE to perform System Information (SI) acquisition and reporting for the cell with the concerned reported PCI. The UE sends the requested measurement, which includes information such as the E-UTRAN Cell Global Identifier (CGI) (which uniquely identifies a cell as opposed to the PCI that can be reused by other cells), the CSG ID and "member/non-member" indication.

D. Access control: The Mobility Management Entity (MME) checks if the UE is allowed to access the reported CSG cell, and the target HeNB checks if the reported CSG ID is the same as the CSG ID that it is broadcasting.

E. Handover preparation and execution: This is done in parallel with the previous step (D), where the MME forwards the HO required message towards the target HeNB and the target HeNB responds with HO request acknowledged message. The source eNB, upon getting the acknowledgement, will order the UE to execute HO towards the target HeNB.

Most measurements in LTE are done by the UE on the serving cell as well as on neighbor cells over some known Reference Symbols (RS) or pilot sequences. The measurements are done for various purposes. Some example measurement purposes are: mobility, positioning, self organizing network (SON), minimization of drive tests (MDT), operation and maintenance (O&M), network planning and optimization etc. The measurements may also comprise cell identification e.g. acquisition of the PCI, the CGI/ECGI, CSG-ID, and/or the System Information of the target cell, be it an LTE cell or any inter-RAT cell.

Examples of mobility measurements in LTE are:
Reference Symbol Received Power (RSRP)
Reference Symbol Received Quality (RSRQ)
Examples of well known positioning measurements in LTE are:
Reference Signal Time Difference (RSTD)
RX-TX time difference measurement Some measurements may also require the eNB to measure the signals transmitted by the UE in the uplink. One important measurement performed by the eNB in LTE is the estimation of Timing Advance (TA). For LTE, uplink orthogonality is required to avoid intra-cell interference and as such it is important to have all the uplink signals time-aligned when they are received at the eNB. Thus, eNBs try to compensate for the propagation delay differences of their UEs (due to their differing distances from the eNB), by instructing them to apply different timing advances, and the UEs will apply the configured timing advance when they are transmitting. The TA can first be estimated during the initial random access procedure when the UE establishes a connection with the eNB (either due to handover or going from idle to connected mode). TA updates are then performed throughout the duration the UE is connected to the eNB, as the propagation delay might change, for example due to the movement of the UE, the change of the environment due to movement of other objects in a dense urban setting, etc. For these updates, the eNBs may measure received uplink signals such as Sounding Reference Signals (SRS), Channel Quality Indicator (CQI), ACKs and NACKs in response to downlink data reception, or the uplink data transmission. The details of uplink timing measurements at the eNB are not standardized and left to implementation.

eNBs that have multiple antenna elements could also use their diversity to measure the Angle of Arrival (AoA) of the uplink signals that they receive from their UEs. The AoA and TA can be used to estimate the relative coordinates of the UEs within the cell.

The PCI is an essential configuration parameter of a radio cell. PCIs are grouped into 168 unique physical layer cell identity groups, each group containing 3 unique identities. Thus, there are only 504 different PCIs altogether (see 3GPP TS 36.211, version 10.4.0). Limiting the number of PCIs makes the initial PCI detection by the UE during cell search easier, but the limited number of PCIs inevitably leads to the reuse of the same PCI values in different cells. Therefore, a PCI might not uniquely identify a neighbor cell, and each cell additionally broadcasts, as a part of the system information (SI), a globally unique cell identifier (CGI/ECGI).

When a new node (e.g. an eNB or HeNB) is brought into the field, a PCI needs to be selected for each of its supported cells, avoiding collision with respective neighboring cells. The use of identical PCI by two cells in close proximity results in interference conditions that might hinder the identification and use of any of them. Otherwise if both cells have a common neighbor, handover measurements that are based on PCI will become ambiguous thus leading to confusing measurement reports or even to the handing over of a UE to the wrong cell, which can cause Radio Link Failure (RLF).

The PCI assignment shall fulfill the following two conditions:

Collision-free: The PCI is unique in the area that the cell covers

Confusion-free: a cell shall not have more than one neighboring cell with identical PCI Using an identical PCI for two cells creates collision, which can only be solved by restarting at least one of the cells and reassigning PCIs upon restart, causing service interruption. PCI confusion, on the other hand, can be resolved by instructing the UEs to read the CGI of the concerned neighbor cell. However, this might require the UEs to stop transmitting/receiving from their serving node during the idle period that is required to read the neighbor's system information, which can be in the range of 250 ms. Therefore, putting a PCI in use which causes either collision or confusion is highly undesirable.

Traditionally, a proper PCI is derived from radio network planning and is part of the initial configuration of the node. The network planning tool calculates the possible PCIs for the new cell(s) based on estimated neighbor relations of the new cells, as estimated by cell coverage area predictions. However, prediction errors, due to imperfections in map and building data, and to inaccuracies in propagation models, have forced operators to resort to drive/walk tests to ensure proper knowledge of the coverage region and identify all relevant neighbors and handover regions. Even the accuracy of that is questionable as some factors such as seasonal changes (the falling of leaves or snow melting) can alter the propagation conditions. Also, the inaccuracy of cell coverage and neighbor relation assessment increases with time as the live network and its surroundings evolve over time.

LTE has support for a feature known as UE ANR (User Equipment Automatic Neighbor Relations), which allows UEs to decode and report the CGI/ECGI information of neighbor cells (in addition to the CSG cell ID in the case of HeNBs) to the serving cell upon request. eNBs maintain a neighbor relation table (NRT) for each of their cells. Apart from the PCI to CGI/ECGI mapping, each neighbor relation contains other relevant information such as the possibility of X2 connectivity.

The CGIs/ECGIs of the neighbor cells are the ones that are used when signaling to the neighbor eNB via the MME, since the MME routes the messages based on eNB identity which is a part of CGI/ECGI. If the policy is to establish X2 for neighbor relations and if X2 is not already available, then the CGI/ECGI can be used to retrieve the target node's IP address, which is used for X2 setup. When the X2 interface is established, the neighboring eNBs can share information about their served cells including PCIs and CGIs/ECGIs. It is also possible to share such information via the Operation and Maintenance (OAM or O&M) system.

As explained above, fingerprinting and proximity indication by user equipments may help reduce the number of neighbor cell measurements and prevent the transmission of unnecessary measurement reports, in particular in heterogeneous network scenarios.

However, the existing mechanisms discussed above are insufficient and/or unreliable in some situations. Thus, there is a need for further improvements in this area.

SUMMARY

An object of some embodiments of the invention is to provide an improved mechanism for fingerprinting and proximity detection.

Particular embodiments address this object by providing a network-based, or network-assisted fingerprinting mechanism.

Some embodiments provide a method in a network node, e.g. a base station, for enabling proximity detection. The network node is comprised in a wireless communications network, and serves a wireless device, which may be a user equipment. According to the method, the network node obtains a fingerprint of a CSG cell, or of an inter-frequency cell. The network node then transmits the fingerprint to the wireless device, thereby enabling the wireless device to determine when it is in the proximity of the cell.

In some variants, the network node receives an indication from the device that it is in the proximity of the cell, and then configures the device to perform and report measurements on the cell.

Some embodiments provide a method in a network node, e.g. a base station, for enabling proximity detection. The network node is comprised in a wireless communications network, and serves a wireless device, which may be a user equipment. According to the method, the network node obtains a fingerprint of a CSG cell, or of an inter-frequency cell. The network node then receives a measurement report from the wireless device. Responsive to determining that the measurement report matches the fingerprint, the network node configures the wireless device to perform and report measurements on the cell.

Some embodiments provide a method in a wireless device, e.g. a user equipment, for proximity detection. The wireless device is served by a network node and comprised in a wireless communications network. According to the method, the wireless device receives a fingerprint of a CSG cell, or of an inter-frequency cell, from the network node. The wireless device then performs one or more measurements. For example, the device may measure the signal strength or signal quality of one or more neighboring cells that it is able to detect. Responsive to determining that the measurements match the fingerprint, the wireless device determines that it is in proximity of the cell.

Some embodiments provide a network node, e.g. a base station, which comprises radio circuitry and processing circuitry. The network node is configured to serve a wireless device, e.g. a user equipment. The processing circuitry is configured to obtain a fingerprint of a CSG cell or an inter-frequency cell. The processing circuitry is further configured to transmit, via the radio circuitry, the fingerprint to the wireless device. Thereby, the wireless device is able to determine when it is in the proximity of the cell.

Some embodiments provide a network node, e.g. a base station, which comprises radio circuitry and processing circuitry. The network node is configured to serve a wireless device, e.g. a user equipment. The processing circuitry is configured to obtain a fingerprint of a CSG cell or an inter-frequency cell. The processing circuitry is further configured to receive, via the radio circuitry, a measurement report from the wireless device. The processing circuitry is further configured to, responsive to determining that the measurement report matches the fingerprint, configure the wireless device to perform measurements on the cell.

Some embodiments provide a wireless device, e.g. a user equipment, which comprises radio circuitry and processing circuitry. The processing circuitry is configured to receive, via the radio circuitry, a fingerprint of a CSG cell, or of an inter-frequency cell, from the network node. The processing circuitry is further configured to perform a measurement. The processing circuitry is further configured to, responsive to determining that the measurement matches the fingerprint, determine that the wireless device is in proximity of the cell.

In various embodiments described herein, the fingerprint is obtained by the network. In some variants, the network also performs the fingerprint check, whereas in other variants, the fingerprint is transmitted to the wireless device. Using a network-based fingerprint improves accuracy, in part because the network is able to make use of a measurements gathered from several UE:s, or fingerprints obtained from other nodes, when creating a fingerprint. Reliability is also improved, because the fingerprinting is independent of the UE implementation. Furthermore, particular embodiments where the network performs the fingerprint check enable proximity detection also for legacy devices, e.g. Release 8 UEs.

Some additional advantages of particular embodiments are:
- Proximity detection is enabled for inter-frequency picos, and as such a UE will perform inter-frequency measurement only when it is in the vicinity of inter-frequency picos.
- A fingerprint can be kept up to date even when an LPN is moved or the radio environment and/or the set of neighboring macro/LPN cells change.
- The relevant identities, PCI, ECGI/CGI and CSG ID, of a CSG cell will be known when proximity is detected.
- When proximity is detected, a UE can be configured to selectively measure and report only the concerned CSG cell instead of all CSG cells within the macro coverage. This may eliminate many measurements and measurement report items and save resources in the UE.
- The UE does not necessarily have to read and report the ECGI/CGI and CSG ID of a CSG cell that is detected as a potential target for handover.
- Some embodiments may be implemented as proprietary value-adding features, e.g. to improve the performance for Release 8 UEs.

ABBREVIATIONS

Figure 1:
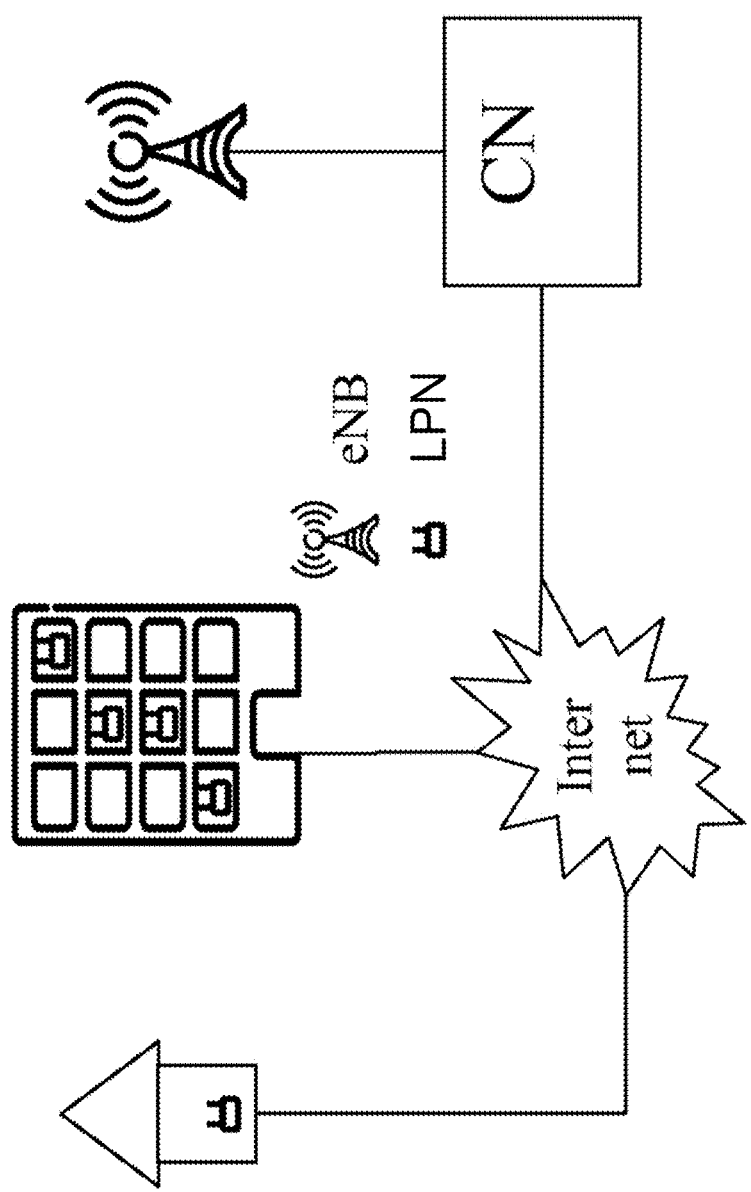
FIG. 1 is a schematic diagram illustrating a typical LPN and eNB deployment scenario.
Figure 2:
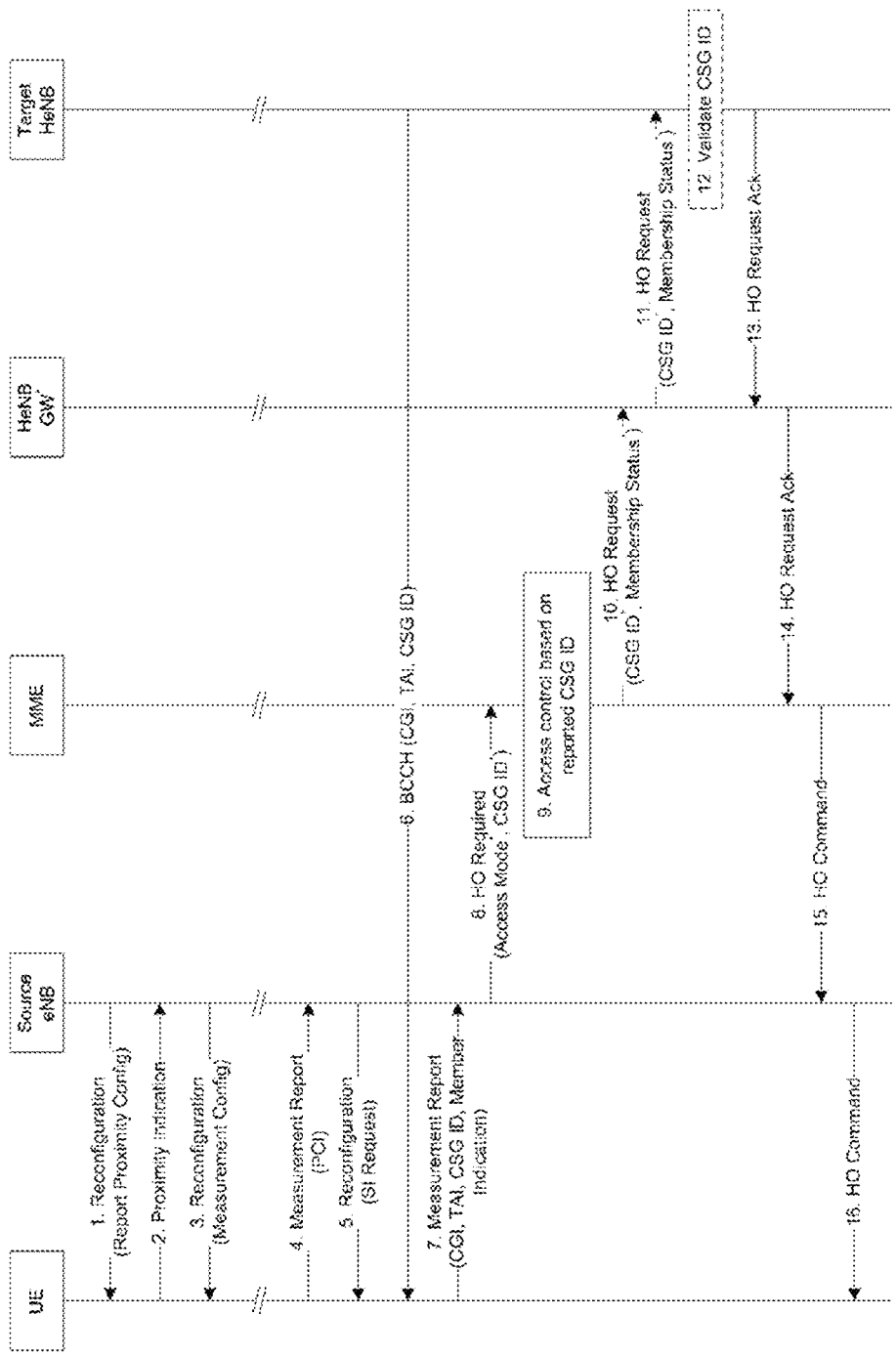
FIG. 2 is a combined signalling scheme and flow chart illustrating mobility to CSG and hybrid cells of a HeNB.

3GPP 3$^{rd}$ Generation Partnership Project
ANR Automatic Neighbor Relation
AoA Angle of Arrival
ASF Automatic Search Function
CGI Cell Global Identifier
CN Core Network
CSG Closed Subscriber Group
CSG ID Closed Subscriber Group Identity
CQI Channel Quality Indicator
DSL Digital Subscriber Line
ECGI E-UTRAN Cell Global Identifier
eNB eNodeB
eNodeB E-UTRAN NodeB
EPS Evolved Packet System
E-UTRAN Evolved UTRAN
FP Fingerprint
GPRS General Packet Radio Service
GPS Global Positioning System
GTP GPRS Tunneling Protocol
GTPv2-C The control plane part of GTP version 2
HeNB Home eNodeB
HeNB GW Home eNodeB Gateway HNB Home Node B
HO Handover
LTE Long Term Evolution
LPN Low Power Node
MDT Minimization of Drive Tests
MME Mobility Management Entity
NAS Non-Access Stratum
NRT Neighbor Relation Table
O&M Operation and Maintenance
OAM Operation and Maintenance
OMA DM Open Mobile Alliance Device Management
OSS Operation Support System
OTA Over The Air
PCI Physical Cell Identity
PLMN Public Land Mobile Network
RAT Radio Access Technology
RLF Radio Link Failure
RS Reference Symbol
RSRP Reference Symbol Received Power
RSRQ Reference Symbol Received Quality
RSTD Reference Signal Time Difference
RRC Radio Resource Control
RX Reception
S1 The interface between the Radio Access Network and the Core Network in EPS.
S10 The interface between two MMEs in EPS.
S1AP S1 Application Protocol
SI System Information
SIB System Information Block
SIB1 System Information Block Type 1
SMS Short Message Service
SON Self Organizing Network
SRS Sounding Reference Signal
TA Timing Advance
TAI Tracking Area Identity
TS Technical Specification
TX Transmission
UE User Equipment
UL Uplink
UMTS Universal Mobile Telecommunications System
USIM Universal Subscriber Identity Module
UTRAN Universal Terrestrial Radio Access Network
X2 The interface between two eNBs in EPS.
X2AP X2 Application Protocol

DETAILED DESCRIPTION

The existing UE-based fingerprinting and proximity indication reporting mechanisms carry several disadvantages.

First, legacy devices, e.g. Release 8 UEs, do not support proximity indication. As such, these devices may be involved in lots of unnecessary measurement and reporting of CSG cells that they are not members of.

Furthermore, proximity indication heavily relies on the UE making a proper fingerprint, but the fingerprint accuracy may differ considerably from one UE implementation to another.

The prior art proximity indications only contain the carrier frequency and no PCI/ECGI/CGI of the concerned CSG cell, and therefore a macro eNB is not able to differentiate which CSG the UE is approaching (for example, if there are two different CSGs within the macro cell coverage that the UE is a member of). This means that the eNB has to configure the UE to measure and report on all CSG cells, even though the majority of the neighboring CSG cells may be irrelevant (i.e. serving CSGs which the UE is not a member of and thus is not allowed to access). If the neighboring CSG cells are numerous, this may represent a significant burden and resource consumption for the UE.

Moreover, a fingerprint made by a UE is not fully reliable, especially if it is based on neighbor cell PCIs. This is because the fingerprint will only reflect a certain number of the UE's last visit(s) to the CSG cell. Since a CSG cell may be moved and the radio environment, in terms of detected macro eNBs, other HeNBs and possibly other transmitters, may change over time, the UE's CSG cell fingerprint may be outdated.

Proximity detection/indication is specified in the context of CSG cells only and currently there is no support for picos. If the network comprises inter-frequency cells, such as inter-frequency picos, the UEs have to be configured to always measure on the carrier frequency of the picos, to be able to take advantage of the offloading advantages offered by the pico layer. This increases the power consumption of the UEs, due to inter-frequency measurements. Some performance degradation can also be expected, as measurement gaps, during which the UE is not able to send or receive data, may have to be configured.

Some embodiments use a network-based and/or network-assisted fingerprinting mechanism to mitigate some of the aforementioned drawbacks of proximity detection. By determining and maintaining the fingerprint in the network, rather than at the UE, many of the problems outlined above may be avoided or reduced, as will be further explained below.

According to some embodiments, it is proposed for LPNs to make fingerprints of themselves, for example considering the top n cells that they or their UEs can detect. Macro eNBs may also fingerprint their neighboring CSG cells or inter-frequency cells, or neighboring LPNs, in a similar manner. The fingerprints made by the macro eNBs and the LPNs may be combined to make a more accurate fingerprint. Furthermore, in the case of CSG cells, if the CSG white list of the UE is available at the eNB, e.g. downloaded from the MME, the eNB is aware of which CSGs a connected UE is a member of and thus is able to determine which fingerprint or fingerprints, if any, are valid for the UE. Macro eNBs may then use the consolidated fingerprint in combination with the downloaded CSG white list to enable/disable UE measurement and reporting of CSG cells appropriately.

Figure 10:
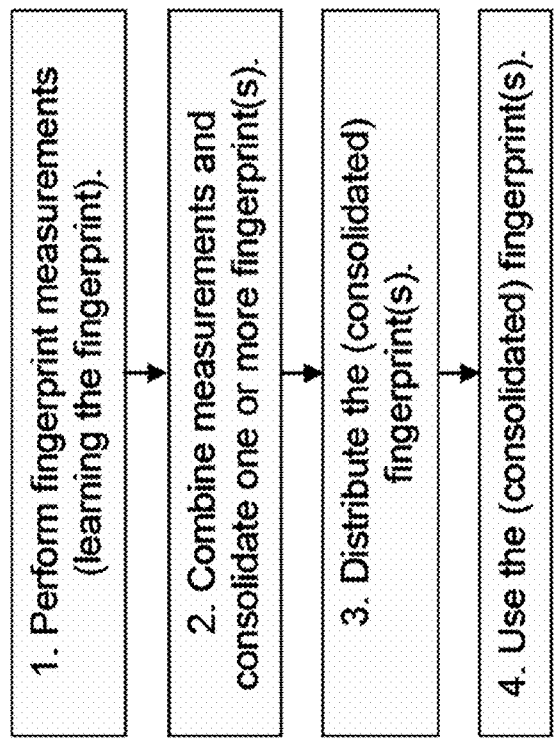
FIG. 10 is a flow chart illustrating high-level steps of some embodiments.
Figure 9:
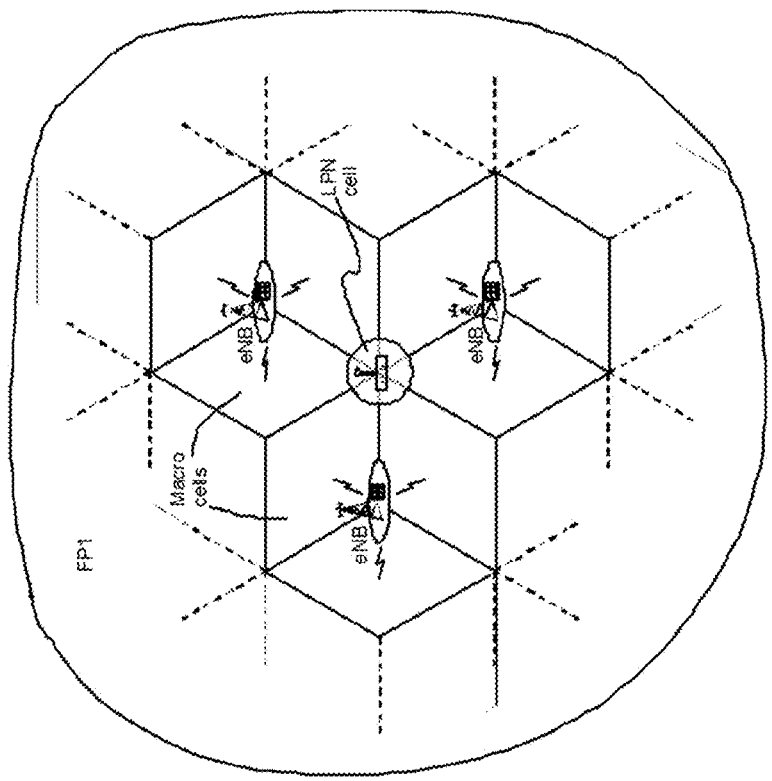
FIG. 9 is a schematic block diagram illustrating a fingerprint with the entire PLMN as its usage/validity area.
Figure 11:
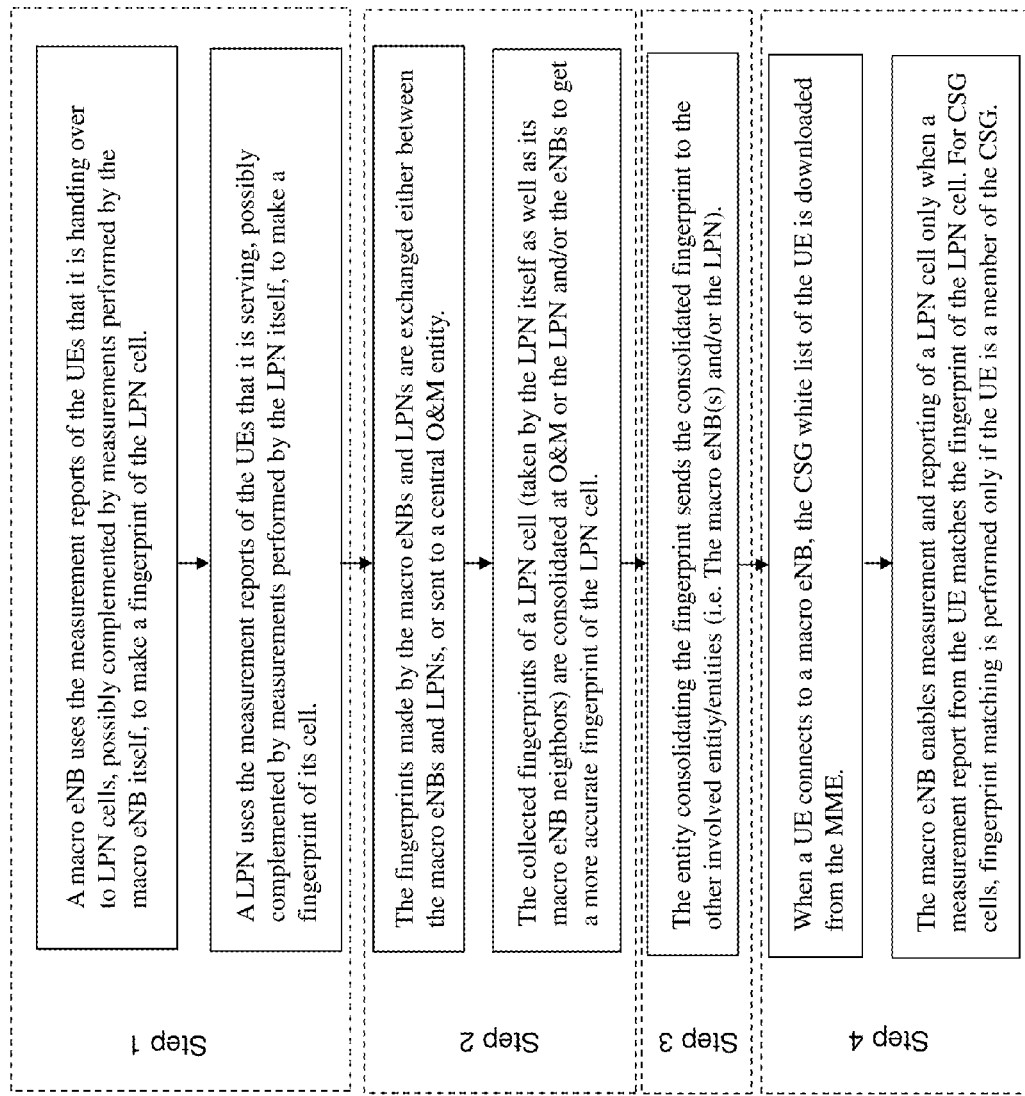
FIG. 11 is a flow chart illustrating some embodiments.

A general concept of some embodiments, as shown in FIG. 10 and FIG. 11, is to enable network based and/or network assisted detection of the proximity of a UE to an inter-frequency or CSG cell, so that proper measurement and measurement reporting configurations could be made. Hence, the UE will start measuring and reporting these cells only when required. This may provide more accurate and more reliable proximity detection than UE autonomous proximity detection would do, and will also prevent the UE from performing unnecessary inter-frequency measurements.

Throughout this description, unless otherwise specified, the term "LPN cell" refers to a cell served by a low-power node. Some examples of an LPN cell that are particularly relevant to this disclosure are: an inter-frequency pico cell, an open or hybrid access inter-frequency femto cell, or a CSG femto cell (which may be either intra- or inter-frequency). It is noted that no specific measurement enhancements are required for measuring intra-frequency open access cells, e.g. intra-frequency picos or open femtos.

"Inter-frequency cell", refers to a cell using a carrier frequency different from that of the serving cell of a particular wireless device. As a particular example, assuming a UE is connected to a macro eNB, an "inter-frequency pico cell" would use a different frequency than the macro layer. From the point of view of a network node, an "inter-frequency cell" uses a different frequency than the cell or cells operated by the node.

Within the context of this disclosure, the term "wireless device" encompasses any type of wireless node which is able to communicate with a network node, such as a base station, or with another wireless device by transmitting and/or receiving wireless signals. Thus, the term "wireless device" encompasses, but is not limited to: a user equipment, a mobile terminal, a stationary or mobile wireless device for machine-to-machine communication, an integrated or embedded wireless card, an externally plugged in wireless card, a dongle etc. The wireless device may also be a network node, e.g. a base station.

The term "network node" encompasses any wireless node which is able to communicate with a wireless device as defined above. Thus, "network node" encompasses, but is not limited to: a base station in general, an eNodeB, a NodeB, a pico, micro or femto base station, or a CSG node such as a HeNB or HNB.

Figure 3:
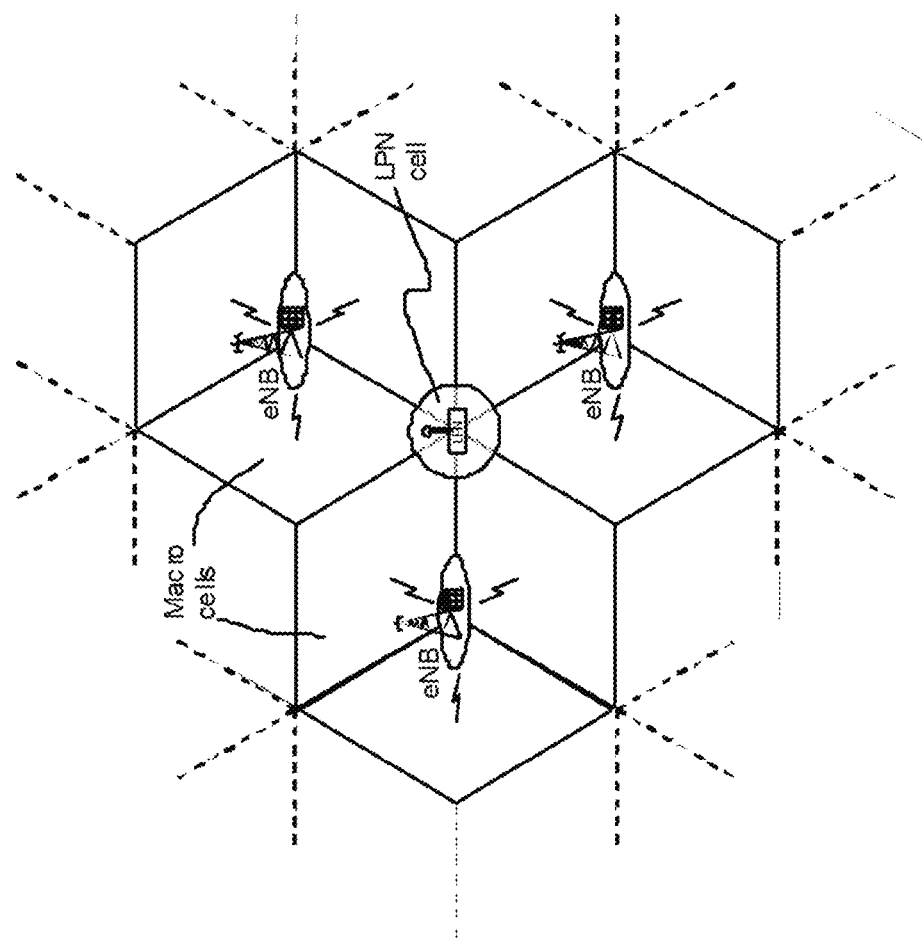
FIG. 3 is a schematic diagram showing a reference deployment scenario with an LPN cell neighboring with six macro cells, belonging to three different eNBs.
Figure 4:
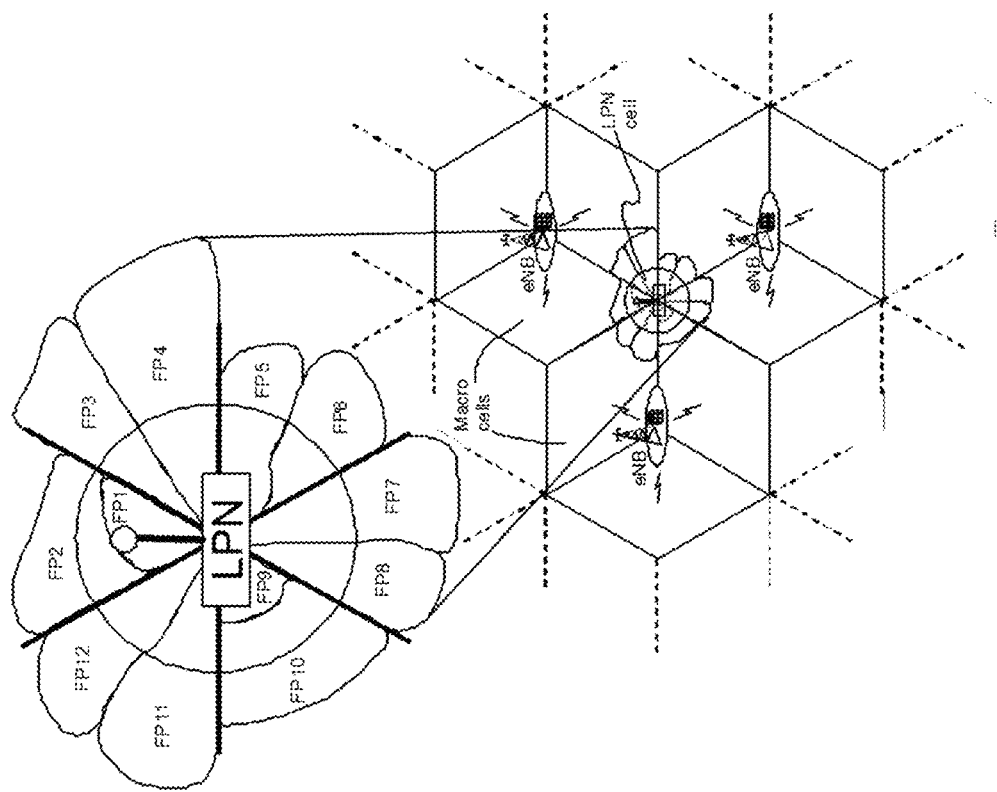
FIG. 4 is a schematic block diagram illustrating fingerprints with location/subarea specific usage/validity areas.
Figure 6:
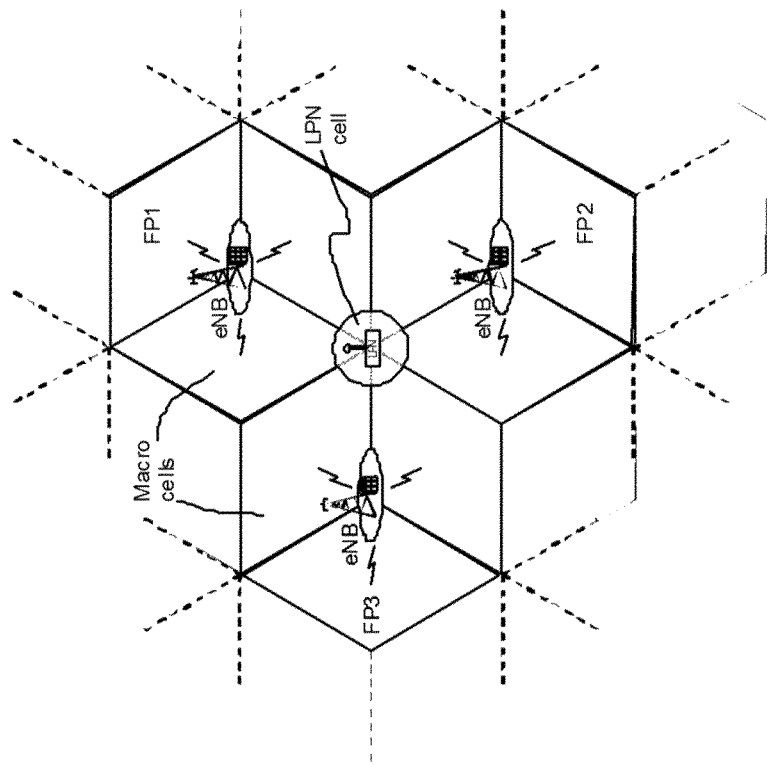
FIG. 6 is a schematic block diagram illustrating fingerprints with eNB area-specific usage/validity areas.
Figure 5:
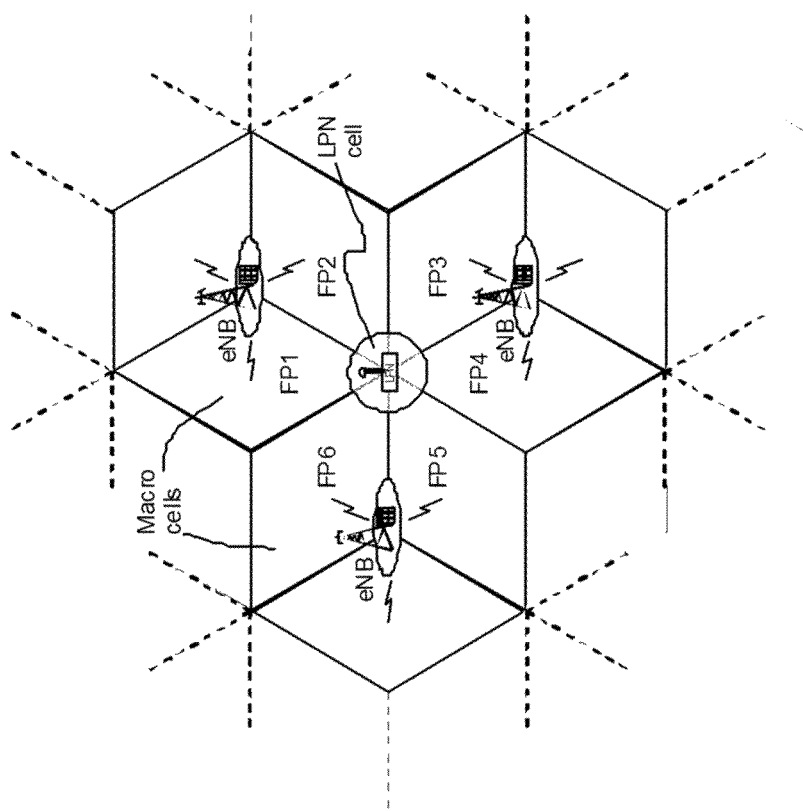
FIG. 5 is a schematic block diagram illustrating fingerprints with macro cell specific usage/validity areas.
Figure 7:
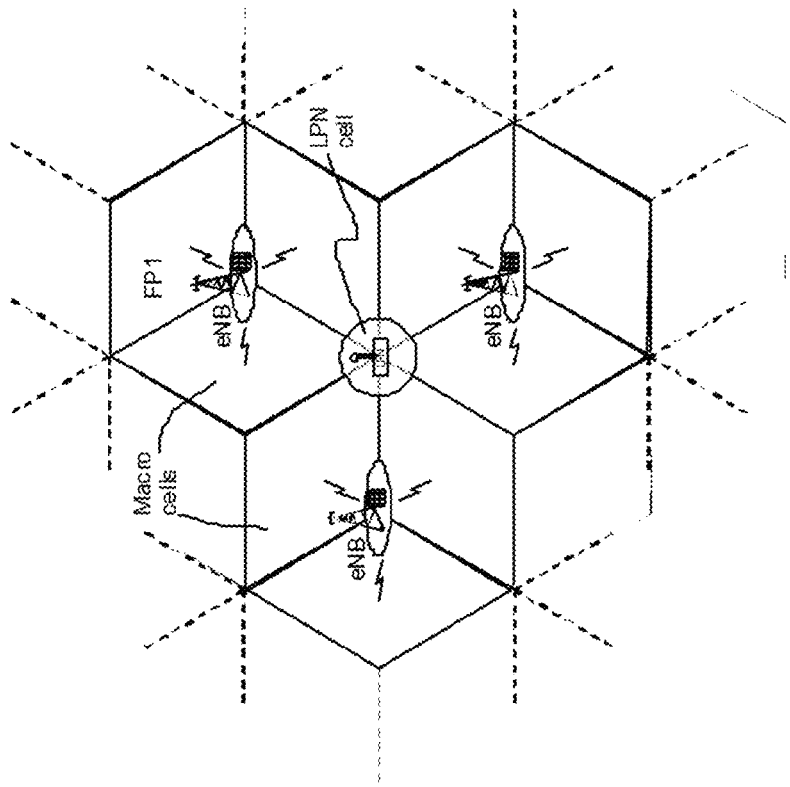
FIG. 7 is a schematic block diagram illustrating fingerprints for which the usage/validity area consists of all the macro cells neighboring with the LPN cell.
Figure 8:
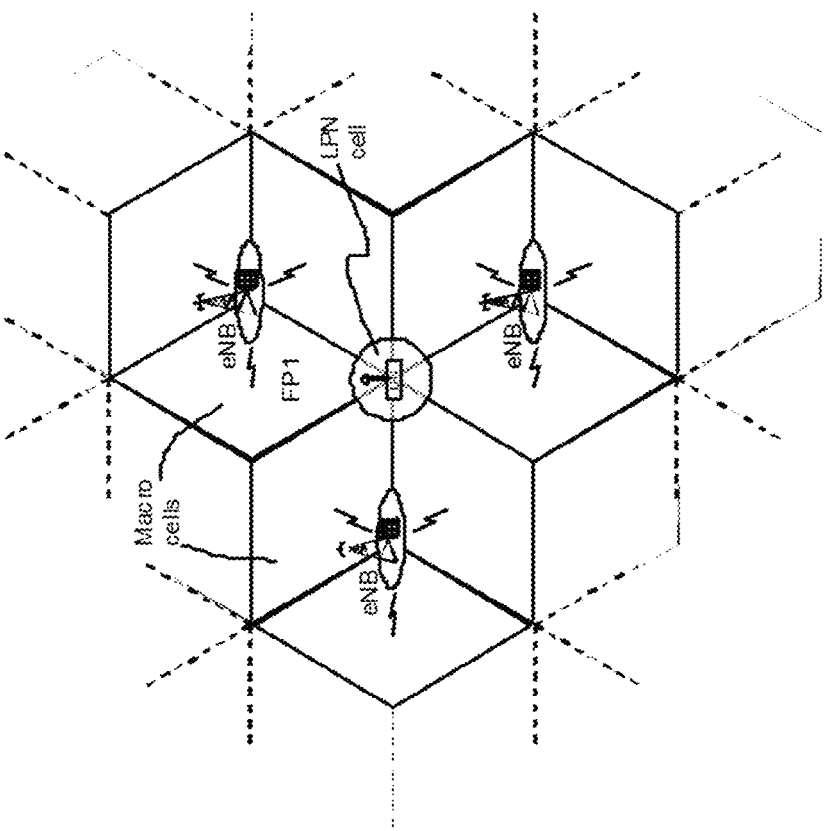
FIG. 8 is a schematic block diagram illustrating fingerprints for which the usage/validity area consists of the eNB areas of all the eNBs neighboring with the LPN cell (i.e. all eNBs which have at least one cell that neighbors with the LPN cell).

A deployment scenario with an LPN cell neighboring with a number of macro cells is illustrated in FIG. 3. This scenario is generic enough to serve well as a reference for the description of the inventive mechanisms. However, it should be appreciated that the concepts presented here are also applicable to other deployment scenarios.

The reference deployment scenario illustrated in FIG. 3 is used below to illustrate that a consolidated fingerprint may have different usage areas, i.e. areas within which it is valid for comparison with measurements performed by a UE. Thus, a fingerprint may be valid for usage in a certain location/sub-area, in a certain macro cell, in a certain eNB area (i.e. all the cells of an eNB), in all the macro cells neighboring with the LPN cell, in the eNB areas of all eNBs neighboring with the LPN cell (i.e. all the cells of all the eNBs that have at least one cell that neighbors with the LPN cell) or in the entire PLMN. However, validity in the entire PLMN may imply a less accurate fingerprint, compared to e.g. cell-specific or area-specific fingerprinting. These different validity/usage areas are illustrated in FIG. 4-FIG. 9.

FIG. 10 shows basic high-level steps of particular embodiments of the invention. Each step comprises different variations and options which may be combined in various ways with the variations and options of other steps. Thus, the concept may be varied in various ways. Each step is elaborated in detail below. FIG. 11 illustrates the solution at a more specific level, representing a number of possible embodiments of the invention.

Step 1: Perform Fingerprint Measurements (Learning the Fingerprint)

In the fingerprint measurement step, the radio environment in and/or in the vicinity of the LPN cell is scanned and the strength of detected signals, e.g. LTE PCIs, are measured. In one embodiment of the invention, a LPN makes a fingerprint of its own cell. This can be achieved by one or more of the following:
1. The LPN is equipped with functionality similar to a UE's receiver and as such can measure all the neighboring cells within its vicinity; or/and
2. the UEs served by the LPN perform measurements and the LPN collects the measurement reports from these UEs; or/and
3. the LPN collects the measurement reports of the UEs that it is handing over to neighbor cells.

The measurements performed in (1), (2), and/or (3) can be combined to get a more accurate fingerprint of the LPN cell.

In another embodiment of the invention, a macro eNB makes a fingerprint of a neighboring LPN cell. This can be achieved by one or more of the following:
1. The macro eNB collects the last (few) measurement report(s) of the UEs that it hands over to the neighboring LPN cells; or/and
2. the macro eNB collects the last calculated TA and AoA of the UEs that it hands over to the neighboring LPN cells or/and
3. the macro eNB performs measurements of its own, e.g. detecting the PCIs of cells in the area.

The measurements performed in (1), (2) and/or (3) can be combined to get a more accurate fingerprint. For example, based on (1) and (2), the eNB can have different mapping tables of the LPN cell fingerprints for different TA and AoA combinations, which can accommodate LPN cells that can be of any shape.

In case of (1) or (2), to speed up the fingerprint learning, a macro eNB may temporarily remove CSG PCIs from the black cell list of UEs, and/or enable inter-frequency measurement to detect inter-frequency picos.

In another embodiment of the invention, both the LPNs and neighboring macro eNBs create fingerprints of the LPN cell, as described above.

Measurements and fingerprint learning may be performed continuously and/or during periodically repeated periods of intense measuring and learning. Another option is that a measurement and learning period may be triggered by an event, such as a command from the O&M system or the appearance of a new LPN cell or a new macro cell neighbor.

Step 2: Combine Measurements and Consolidate One or More Fingerprint(s)

In the measurement combining and fingerprint consolidation step measurements performed by one or more entities are collected and combined, e.g. using an algorithm based on weighted averaging of signal strengths, to form a consolidated fingerprint, assumedly representing a better fingerprint than any of the individual measurements. Another option is to let the consolidated fingerprint consist of signal strength ranges, derived from the measurements to be combined, within which transmissions from corresponding cells (e.g. PCIs) are expected to be received (depending on the exact location) in the area represented by the fingerprint. This combining and consolidation may be performed in various ways depending on which entities performed the fingerprint measurements.

If the LPN is the only entity performing the measurements, the measurement combining and fingerprint consolidation are trivial (e.g. averaging several sequential measurements).

If the LPN utilizes measurements reported by its connected UEs, possibly (and preferably) complemented by measurements performed by the LPN itself, the LPN collects measurements from the UEs, combines them with each other and with its own measurements (if any) and thereby arrives at a consolidated fingerprint, e.g. through a weighted average summation of the signal strengths of the concerned entries in the fingerprint. The combination can be performed in several ways.

According to one example, the measurements performed by UEs that are handed over to neighbor cells are the ones that approximate the border region of the LPN cell, and can be assigned a higher combining weight when the combination is made. According to another example, the measurements performed by the LPN itself and the measurements performed by UEs that are not handed over to neighbor cells (i.e. their measurement reports did not trigger handovers) are the ones that represent the interior parts of the LPN cell and may thus, from one perspective, be the ones that are best suited to create a single consolidated fingerprint of the LPN cell. Hence, according to this example, these measurements are given higher combining weight in the measurement combination.

If only the macro eNB performs the fingerprint measurements, and it uses only the PCIs that it can detect, the result will in essence be a fingerprint representing the site of the eNB (or the eNB antenna(s)). This fingerprint would thus be the same for all LPN cells neighboring with (e.g. covered by) the eNB's cells. Although this is conceivable, it is not a very attractive solution, since the fingerprint will be coarse and possibly inaccurate.

It is more likely that the macro eNB utilizes the UEs connected to it to perform measurements from which to compile a fingerprint. As mentioned above, to create a fingerprint of a certain LPN cell, the macro eNB would then use the measurement reports from UEs that are handed over to the LPN cell (triggered by the measurement report). Thus, the macro eNB collects such measurement reports and combines them to form a consolidated fingerprint. The measurement combining could consist e.g. of a weighted, or un-weighted averaging of the reported signal strengths and their associated PCIs. The eNB may also include measurements performed by itself in the combination. However, since these measurements would not necessarily represent a site at which handovers into the concerned LPN cell would occur, it would probably be preferable to give these measurements, if at all used, lower weight than the measurements performed by the UEs.

If the macro eNB associates TA and AoA measurements with the measurements reported by UEs that are handed over to a certain LPN cell, the macro eNB may create multiple fingerprints for the LPN cell, each associated with a different location (or area). As an example, the eNB may divide the handover region (i.e. the region in which handovers to the LPN cell are repeatedly triggered) into sub-areas. Then, using the TA and AoA measurements, the eNB may calculate the location, and hence the sub-area, of a reporting UE. Based on these calculations, the eNB may then combine the reported measurements from UEs in a certain sub-area and create a consolidated fingerprint for this particular sub-area. This way, for a certain LPN cell, the eNB may create a (more or less) unique consolidated fingerprint for each sub-area.

If both the LPNs and the macro eNBs collect UE measurements and/or perform measurements themselves, the measurements are collected by a single entity which performs the combining. There are (at least) three alternative combining entities:

The LPNs. In this case the macro eNB sends its (collected and/or performed) measurements to the LPN and the LPN combines all the measurements (the ones received from neighbor macro eNBs and the ones collected from the UEs and/or performed by the HeNB itself) into a consolidated fingerprint for the LPN cell. Again, the combining may, for instance, consist of a weighted or un-weighted averaging of reported signal strengths. As an alternative, the macro eNBs and the LPN may each first create a consolidated fingerprint, then the macro eNBs send their calculated consolidated fingerprint to the LPN and the LPN combines these fingerprints into a single consolidated fingerprint. Also with this alternative, weighted or un-weighted averaging of signal strengths is a possible combining algorithm. If the LPN cell has more than one macro cell neighbor, the LPN may either create a single fingerprint for the LPN cell or one consolidated fingerprint for each neighboring macro cell. In the former case, the LPN would combine the measurements or fingerprints received from all eNB neighbors with its own (collected and/or performed) measurements or calculated fingerprint. In the latter case, the LPN performs this operation with one macro eNB or one macro cell neighbor at a time. Yet another alternative is for the macro eNB to use TA and AoA measurements for the purpose of using location/sub-area specific LPN cell fingerprints, the HeNB may combine measurements/fingerprints and calculate one consolidated fingerprint for each location/sub-area.

The macro eNB. In this case the LPN sends its (collected and/or performed) measurements or consolidated fingerprint to the neighboring macro eNBs and the macro eNBs combine all data into a single consolidated fingerprint. With this procedure, there will be a single consolidated fingerprint for each macro eNB that neighbors with the LPN cell. Alternatively, if a macro eNB has more than one cell that neighbors with the LPN cell, the eNB may calculate one consolidated LPN cell fingerprint for each of its cells. Another alternative is for the macro eNB to use TA and AoA measurements for the purpose of using location/sub-area specific LPN cell fingerprints. The eNB may combine measurements/fingerprints and calculate one consolidated fingerprint for each location/sub-area.

The O&M system. In this case both the LPN and the macro eNB send their respective (collected and/or performed) measurements or calculated consolidated fingerprint to the O&M system. Then the O&M system combines all or subsets of the received measurements or fingerprints to form one or more consolidated fingerprint(s) for the LPN cell. As above, this may result in a single fingerprint for the LPN cell, one LPN cell fingerprint for each neighboring macro eNB, one LPN cell fingerprint for each neighboring macro cell and/or one LPN cell fingerprint for each location/sub-area.

All above described transfers of measurements or fingerprints between macro eNBs and LPNs, or vice versa, preferably takes place across the X2 interface, using an existing or a new X2AP messages. If no X2 interface is established between an eNB and a LPN, the information may optionally be conveyed via one or more MMEs, using the Si interface and the S10 interface (in the inter-MME case), e.g. in conjunction with handover signaling, using existing or new S1AP messages and (in the inter-MME case) GTPv2-C messages.

Fingerprint consolidation may be performed periodically, based on continuous measurements or repeated intense measurement and fingerprint learning periods. Another option could be that the consolidation is triggered by an event, e.g. an event that triggers measurement and fingerprint learning.

Step 3: Distribute the (Consolidated) Fingerprint(s).

When a fingerprint has been consolidated, it is distributed to the entity or entities that can make use of it. If the O&M system is the one performing the consolidation, the fingerprint is distributed to macro eNB(s) which is(are) going to use it. That is, a fingerprint that is relevant for a single macro eNB (an eNB specific, macro cell specific or location/sub-area specific LPN cell fingerprint), is transferred to that eNB. If the fingerprint is relevant to multiple macro eNBs, i.e. if only a single fingerprint is consolidated for the LPN cell, even though there are macro cells of multiple eNBs neighboring with it, the fingerprint is sent to all these eNBs. In the latter case, the fingerprint may also be sent to the concerned LPNs for further delivery to the UEs (in the case of CSGs, only to those UEs that are members of the CSG)

As an option, in all the above cases the O&M system may, in the case of CSGs, in addition to or instead of transferring the fingerprint to the relevant eNB(s)/LPN, convey the fingerprint to the UEs that are members of the CSG. This may be done using OMA DM, OTA USIM configuration or SMS, or simply the same means that are used for conveying a CSG white list to a UE. As mentioned above, the concerned UEs may also receive the fingerprint, e.g. through RRC signaling, from the CSG HeNB, which in turn received it from the O&M system. Yet another option is that the O&M system sends the fingerprint to the MME(s) that is(are) connected to the HeNB and subsequently, when a concerned UE is registered in the MME, the MME forwards the fingerprint to the UE using NAS signaling.

A fingerprint that is consolidated by a macro eNB is typically relevant only for the macro eNB itself and it is thus not sent to any other entity. However, optionally the fingerprint may be transferred to the LPN for further delivery to the UEs (and in the case of CSGs, only to the UEs which are members of the CSG). Strictly speaking, UEs are not members of CSGs—users are. That is, the membership is tied to a user in the form of a subscription. However, for convenience, and to simplify the description, in the context of this document, when a user/subscriber who is a member of a certain CSG is using a certain UE, it is somewhat inaccurately stated that the UE is a member of the CSG.

If an LPN has consolidated a fingerprint, the fingerprint is distributed to the macro eNB(s) and/or the UEs that the fingerprint is relevant for. That is, an eNB specific, macro cell specific or location/sub-area specific fingerprint is transferred to the concerned eNB neighbor, whereas if only a single fingerprint is consolidated for the LPN cell, irrespective of the number of macro cell/eNB neighbors, this fingerprint is distributed to all neighboring eNBs. Additionally, in all cases, the consolidated fingerprint(s) may optionally also be transferred to UEs (in the case of CSGs, only to the UEs that are members of the CSG), e.g. using RRC signaling. The distribution of the fingerprint(s) to CSG member UEs may be significantly spread out in time, since the UEs may only occasionally be connected to the CSG HeNB.

Transfers of consolidated fingerprints between macro eNBs and the LPN, or vice versa, preferably takes place across the X2 interface, using existing or new X2AP messages. If no X2 interface is established between an eNB and a LPN, the information may optionally be conveyed via one or more MMEs using the S1 interface and the S10 interface (in the inter-MME case), e.g. in conjunction with handover signaling, using existing or new S1 AP messages and (in the inter-MME case) GTPv2-C messages.

Step 4: Use the (Consolidated) Fingerprint(s)

Preferably, the eNB maintains a table for mapping between PCIs and CSG IDs (and ECGIs/CGIs) (including ambiguous PCIs), which can be built up through ANR as described above.

When a UE connects to a macro eNB, the UE's CSG white list is downloaded from the MME to the eNB in conjunction with the S1 connection establishment (preferably in the S1AP INITIAL CONTEXT SETUP REQUEST message). Note that the possibility to download the UE's CSG white list from the MME to the eNB during S1 connection establishment is known from prior art.

Initially the macro eNB by default configures the UE not to measure on LPN cells (i.e. configures the UE not to measure on pico/femto carrier frequencies or placing CSG PCIs in the black cell list). An exception to this is when the UE enters the macro cell through handover from a LPN cell, in which case the UE is configured to include the PCI (and carrier frequency) of the concerned LPN cell in its measurements and measurement reporting.

When the UE is configured to exclude CSG PCIs and/or the carrier frequencies used by inter-frequency picos/femtos from measurements and measurement reporting, the macro eNB uses the fingerprint to determine when it is useful to configure the UE to measure on neighboring LPN cells and to report such measurements. In case of CSG cells, the macro eNB first checks the UE's CSG white list to see if there are any neighboring CSG cells serving any of the CSG(s) that the UE is a member of. Provided that at least one neighboring CSG cell serves a CSG that the UE is a member of, the eNB starts to compare the measurement reports from the UE with the relevant fingerprint(s). In the case of inter-frequency picos, there is no need to check the CSG white list, and the fingerprint comparison can be started as soon as the UE is handed over to the macro. If the eNB's fingerprint of a LPN cell is macro cell specific, the eNB uses it (i.e. compares measurement reports with it) only when the UE is located in the concerned macro cell. Similarly, if a fingerprint is location/sub-area specific, the eNB uses it only when the UE is located in the concerned location/sub-area. Optionally, the eNB may also configure the UE to send periodic measurement reports in order to facilitate fingerprint match detection.

When a measurement report (or optionally a sequence of measurement reports or an average of a sequence of measurement reports) from the UE matches the fingerprint of a LPN cell relevant to the UE (which in the case of CSGs means that the UE has membership to that cell), the eNB configures the UE to measure on the concerned LPN cell (and report such measurements). That is, in case of CSG cells, the eNB removes the CSG cell PCI from the black cell list and, in the inter-frequency pico/femto case, configures the UE to measure on the LPN carrier frequency. The eNB may also choose to configure a lower than usual measurement report threshold for the LPN cell, so as to facilitate handover to the LPN cell motivated by policy rather than relative received signal strengths.

When the eNB subsequently detects that the UE has left the fingerprint area (again by comparing one or more measurement reports with the fingerprint), the eNB resets the measurement configuration of the UE, so that the UE will not measure the concerned LPN cell (i.e. in the case of CSG cell, by re-including the PCI of the CSG cell in the black cell list or in the case of inter-frequency pico/femto, by configuring the UE not to perform measurement on the LPN carrier frequency). Optionally two slightly different fingerprints can be used, one for entering and one for leaving the fingerprint area, to create a hysteresis between entering and leaving the fingerprint area. This would serve to avoid too frequent reconfigurations of the UE's measurement and measurement reporting behavior (similar to "ping-pong" handovers). The difference between the two fingerprints could e.g. be a slight difference in the signal strength range(s) of one or more of the neighbor cell(s) included in the fingerprint.

An alternative to using the fingerprints for eNB based proximity detection is that the eNB transfers the relevant fingerprint(s) (i.e. the fingerprint(s) of inter-frequency LPNs or CSG cell(s) serving CSG(s) of which the UE is a member) to the UE when the UE connects to the cell. For this information transfer the eNB may use e.g. the RRCConnectionSetup message (during RRC connection establishment) or the RRCConnectionReconfiguration message (after RRC connection establishment or after handover into the cell). The actual proximity detection (fingerprint matching) would then be UE based, as in the current specifications, but the UE uses the fingerprint information that it has got from the eNB. When leaving the cell, the UE may discard the fingerprint(s) received in the cell.

Instead of the macro eNB, a LPN may transfer the fingerprint(s) to the UEs that are connected to it.

The use of the fingerprint that is sent from a macro eNB or the LPN relieves the UEs from creating their own LPN cell fingerprints. In addition, the fingerprints may be more accurate, since they may be based on more measurements than a fingerprint created by a single UE.

If the UE can perform fingerprinting on its own, which may be possible for Release 9 or later UEs, the fingerprint it has made may be combined with the fingerprint it receives from the macro eNB or/and the CSG HeNB to get a more accurate consolidated fingerprint. Since proximity detection/indication is currently supported only for CSGs, this is not applicable to inter-frequency picos.

Note that an additional benefit of the PCI to CSG ID+ECGI/CGI mapping table is that a UE that reports strong reception from a PCI matching its CSG cell does not have to read and report the System Information from the CSG cell before handover could be initiated. Only if the PCI is ambiguous (according to the mapping table) will the eNB request the UE to read and report the data from the System Information of the CSG cell.

Note also that the method may be used even without downloading the UEs CSG white list to the eNB. However, in that case the eNB has to consider the fingerprints of all neighboring CSG cells, instead of only the one(s) it knows that the UE is allowed to use, which makes the method less efficient. Still, the method may provide advantages, in particular in inter-frequency pico/femto deployment scenarios. In such scenarios the UE will not have to measure on the frequency used by the LPNs unless it is determined, based on a fingerprint match, that the UE is in the vicinity of a LPN cell.

Figure 12:
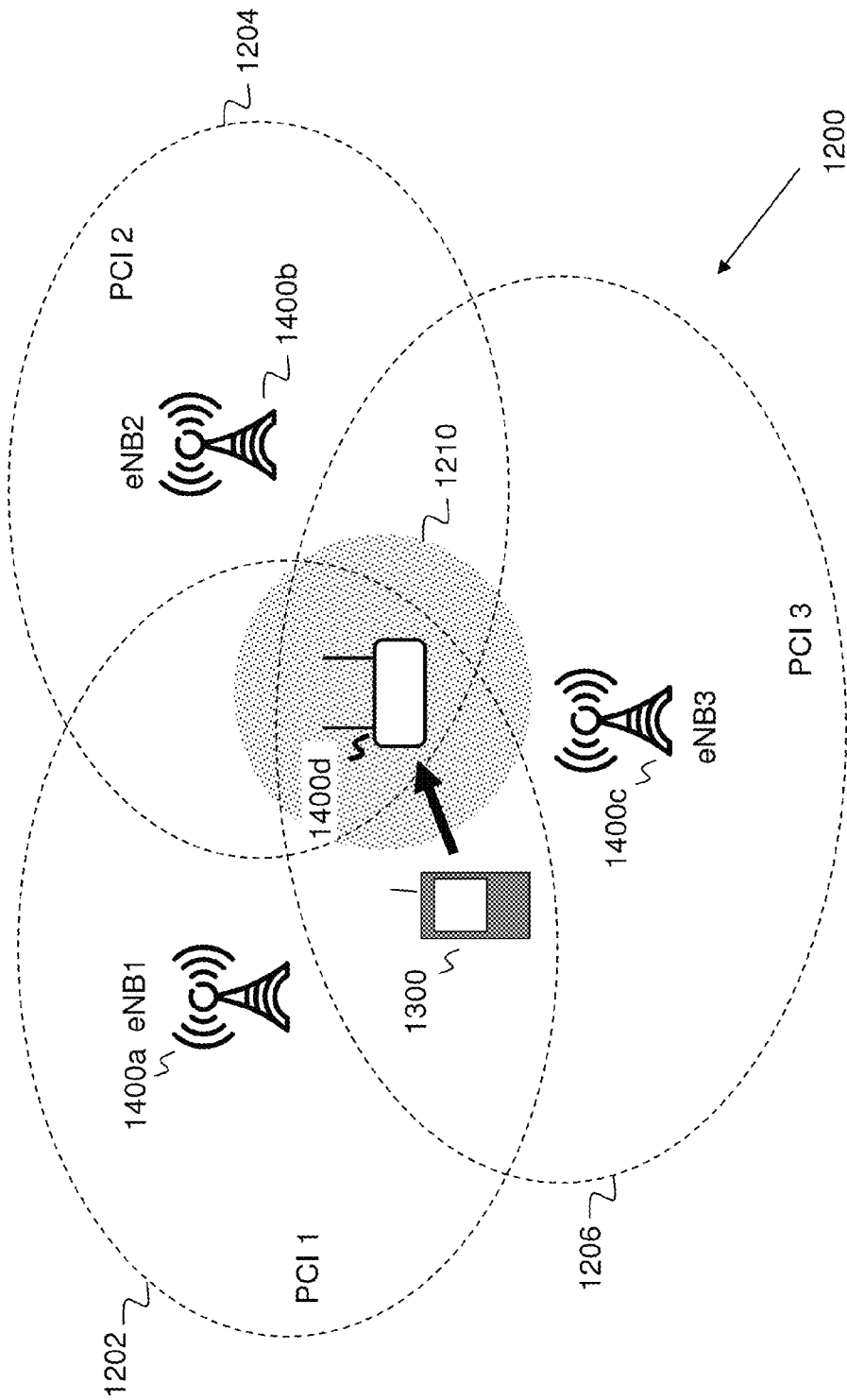
FIG. 12 is a schematic diagram showing a wireless communications network.

FIG. 12 illustrates an example wireless communications network in which some embodiments may be implemented. The network comprises three macro cells served by base stations eNB1, eNB2 and eNB3, which may be generally referred to as network nodes 1400*a-c*. The cells are identified by PCI1, PCI2, and PCI3 respectively. A wireless device 1300, e.g. an LTE UE, is located in the cell served by network node 1400*a*, but is moving toward the coverage area of network node 1400*d*. Network node 1400*d* may be a CSG cell, e.g. a HeNB operating in closed access mode, or it may be an inter-frequency cell, i.e. a cell which operates on a different frequency than the cells served by nodes 1400*a-c*. As a particular example, node 1400*d* may be an inter-frequency pico cell.

With reference to FIG. 12 and the flowchart in FIG. 15*a*, an example method in a network node 1400*a* for proximity detection will now be described. The network node 1400*a* is comprised in wireless communications network 1200, and serves the wireless device 1300.

According to the method, the network node 1400*a* obtains 1510 a fingerprint of cell 1210, which is a CSG cell or an inter-frequency cell. The fingerprint comprises a set of measurement values which are characteristic for a region in the vicinity of the cell 1210. For example, the fingerprint may comprise a set of physical cell identities and a signal strength corresponding to each physical cell identity. As another example, the fingerprint may comprise a range of signal strengths corresponding to each physical cell identity. Alternatively or additionally, the fingerprint may comprise location information, such as GPS coordinates, for a region in the vicinity of the cell.

In a variant, the fingerprint is obtained by gathering measurement reports from at least one wireless device served by the network node. That is to say, network node 1400*a* collects a number of measurements, over a certain period of time, from wireless devices which are connected to it. In a particular embodiment, measurement reports are gathered in conjunction with handover of a wireless device to or from the cell 1210. In other words, network node 1400*a* gathers measurements from wireless devices which are in the process of being handed over to cell 1210, and/or from devices which have recently been handed over from cell 1210. It is assumed that during the period when fingerprint measurements are gathered, the wireless devices are configured to always measure and report on cell 1210.

Fingerprint information may also be obtained by receiving GPS coordinates corresponding to the location of the wireless terminals. The fingerprint may then be obtained based on the GPS coordinates, possibly in combination with other information as described above. Location information for the fingerprint may also be obtained by requesting a wireless terminal which is known to be in the vicinity of cell 1210 to perform a positioning measurement. The network node 1400*a* then receives position information from the wireless device, and obtains the fingerprint based on the position information. Alternatively or additionally, the network node 1400*a* may obtain location information, such as GPS coordinates, for the cell 1210 itself, e.g. by receiving a message from the node 1400*d*, or by performing measurements of signals received from the cell 1210.

Obtaining the fingerprint may further comprise consolidating two or more measurement reports, or fingerprints for the cell, into a single fingerprint. As an example, network node 1400*a* may take a weighted or non-weighted average of the measurement values from the measurement reports to obtain the fingerprint. For example, measurement values that are associated with the same PCI may be averaged. As another example, one or more signal strength ranges may be derived from the measurement reports, where each signal strength range corresponds to consolidated measurements on a cell, e.g. one of the cells 1202-1206. Each range may be associated with the PCI value of the corresponding cell.

One or more of the consolidated fingerprints may be received from another network node, for example from the network node 1400*d* serving the cell 1210, or from an O&M node. As explained above, network node 1400*d* may also take a fingerprint of itself, and may send this fingerprint to network node 1400*a* for consolidation. A central O&M node may manage the fingerprint from node 1400*a*, and possibly other fingerprints obtained by e.g. network nodes 1400*b-c*.

In a further variant, the consolidated fingerprint may be associated with an area or region. This may be achieved by obtaining a location corresponding to each gathered measurement report. The location may be obtained in a variety of known ways, e.g. by measuring the angle-of arrival and timing advance of the wireless device from which the measurement report is gathered, obtaining a GPS location of the wireless device, or obtaining a positioning measurement for the wireless device. Two or more of the gathered measurement reports are then consolidated into a fingerprint. The locations corresponding to the reports included in the fingerprint will define an area, which will be associated with the consolidated fingerprint. The consolidated fingerprint are valid for wireless device that are located within this area. Thus, in this variant the network node 1400*a* may apply the fingerprint to the wireless device 1300 only if it is located within the associated area.

It should be noted that any of the above-mentioned ways of obtaining fingerprint information may be combined. For example, multiple fingerprints, for example fingerprints received from multiple neighboring base stations, may be consolidated into a single fingerprint. It is also possible to consolidate one more measurement reports with one or more fingerprints received from other nodes.

After obtaining the fingerprint, the network node 1400*a* receives 1520 a measurement report from the wireless device 1300. This report may comprise neighbour cell measurements for one or more cells which the wireless device 1300 is able to detect. For example, the report may comprise signal strengths for PCI1, PCI2, and PCI3 respectively. Typically, the device 1300 is not yet configured to report the signal strength for cell 1210 at this stage.

The network node 1400*a* now compares the measurement report with the fingerprint obtained in step 1500. If the network node 1400*a* determines 1530 that the measurement report matches the fingerprint, it configures 1540 the wireless device 1300 to perform and report measurements on the cell. In other words, the network node compares the values in the measurement report with the values in the fingerprint, and determines, using some threshold criteria, whether there is a match. As a particular non-limiting example, if the fingerprint comprises signal strength ranges for PCI1-3, and the reported signal strength values for PCI1-3 fall within the respective ranges, this may be considered as a match.

The configuration step may comprise instructing the wireless device 1300 to remove a physical cell identity, PCI, of the cell 1210 from a blacklist, particularly if the cell 1210 is an intra-frequency CSG cell. In another variant, where cell 1210 is an inter-frequency cell, the configuration comprises instructing the wireless device 1300 to perform measurements on a frequency assigned to the cell 1210.

Optionally, network node 1400*a* may send the fingerprint to a second network node, e.g. an O&M node, or one of its neighbors 1400*b-c*.

With reference to FIG. 12 and the flowchart in FIG. 15*b*, another example method in a network node 1400*a* for proximity detection will now be described. As in the above example, the network node 1400*a* is comprised in wireless communications network 1200, and serves the wireless device 1300.

This method is based on the previous example. Thus, steps 1510-1540 are performed in the same way as described above, and the same variations are applicable.

This example further comprises receiving 1550 a second measurement report from the wireless device. The second report is compared to the fingerprint in a similar way as described above. However, this time network node 1400*a* determines 1560 that the report does not match the fingerprint. Using the same example as above, the reported signal strengths fall outside of the ranges comprised in the fingerprint, or the report does not contain the same PCIs as the fingerprint. As a result, network node 1400*a* assumes that network node 1300 is no longer in the vicinity of cell 1210, and therefore configures 1570 the wireless device 1300 to stop performing and reporting measurements on the cell. In the case where cell 1210 is a CSG cell, this may be done by instructing the wireless device 1300 to add the PCI of the CSG cell 1210 into the blacklist. If cell 1210 is an inter-frequency cell, this may be achieved by removing the frequency assigned to the cell 1210 from the allowed measurement frequencies.

In a variant of this embodiment, the network node 1400*a* obtains a second fingerprint, corresponding to an area outside the cell 1210. This may be achieved, as a non-limiting example, by gathering measurement reports which are not in the process of being handed over to cell 1210, and which have not recently been handed over from cell 1210. Those reports are likely to correspond to wireless devices which are not in close proximity to cell 1210, and the resulting fingerprint will thus correspond to an area outside cell 1210. When network node 1400*a* receives 1550 the second measurement report from the wireless device 1300, it compares the second measurement report with the second fingerprint. If there is a match, the network node 1400*a* assumes that the wireless device 1300 is now in an area which is not close to cell 1210. As a result, network node 1400*a* configures 1570 the wireless device to stop performing and reporting measurements on the cell, e.g. in one of the ways described above.

With reference to FIG. 12 and the flowchart in FIG. 15*c*, yet another example method in a network node 1400*a* for proximity detection will now be described. As in the above examples, the network node 1400*a* is comprised in wireless communications network 1200, and serves the wireless device 1300. This example may be based on either one of the examples in FIG. 15*a* or 15*b*.

Thus, steps 1510 and 1520 are performed as described above, and the same variations apply.

However, before checking the fingerprint, the network node 1400*a* checks 1522 if the speed of wireless device 1300 is below a preconfigured threshold speed, and/or if the load of cell 1210 exceeds a preconfigured threshold load. That is to say, the network node 1400*a* may check either one of, or both of these conditions. If the speed is above the threshold, and/or if the cell load is below the threshold, the network node 1400*a* does not continue to check the fingerprint. This step avoids performing unnecessary measurements and handovers of fast-moving wireless devices, e.g. a device inside a moving car. Handing over such a device to cell 1210 would not be beneficial, as the device would in any case be unlikely to stay in the vicinity of cell 1210. It is also avoided to hand over devices to overloaded cells.

In a particular variant, the cell is a CSG cell. The network node 1400*a* may then also determine 1524 whether the wireless device 1300 is allowed to access the cell 1210. Alternatively, the network node may check 1524 if the wireless device 1300 is allowed to access at least one CSG cell which is a neighbor of cell 1202. If this is allowed, the network node 1400*a* proceeds to steps 1530 and 1540, which are performed in the same way as described above.

With regard to CSG cells, the network node 1400*a* may optionally obtain a CSG whitelist, i.e. a list of allowed CSG cells, for the wireless device 1300. In this variant, the network node 1400*a* only performs the fingerprint check if the CSG id corresponding to cell 1210 is in the whitelist of the wireless device 1300, i.e. the measurement report from the device 1300 is only compared to the fingerprint if the wireless device 1300 is allowed to access the CSG cell 1210.

It should be noted that in some variations, only one of steps 1522 and 1524 may be performed. Furthermore, steps 1522 and 1524 are not interrelated and may be performed in any order before step 1530. It is also possible to perform one or both of steps 1522 and 1524 before step 1520.

Figures 15A, 15B:
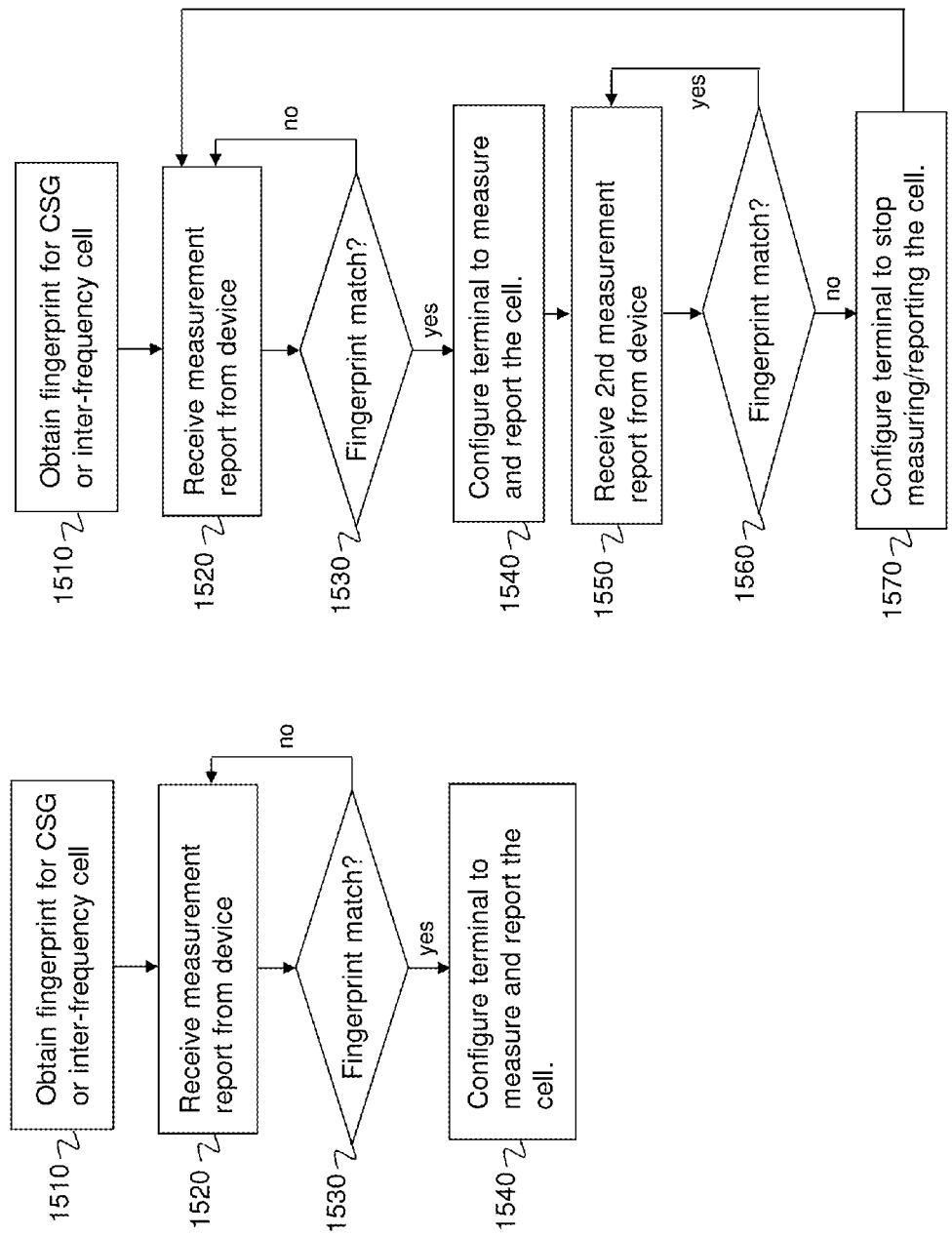
FIGS. 15a-c are flow charts illustrating methods in a network node according to some embodiments.
Figure 15C:
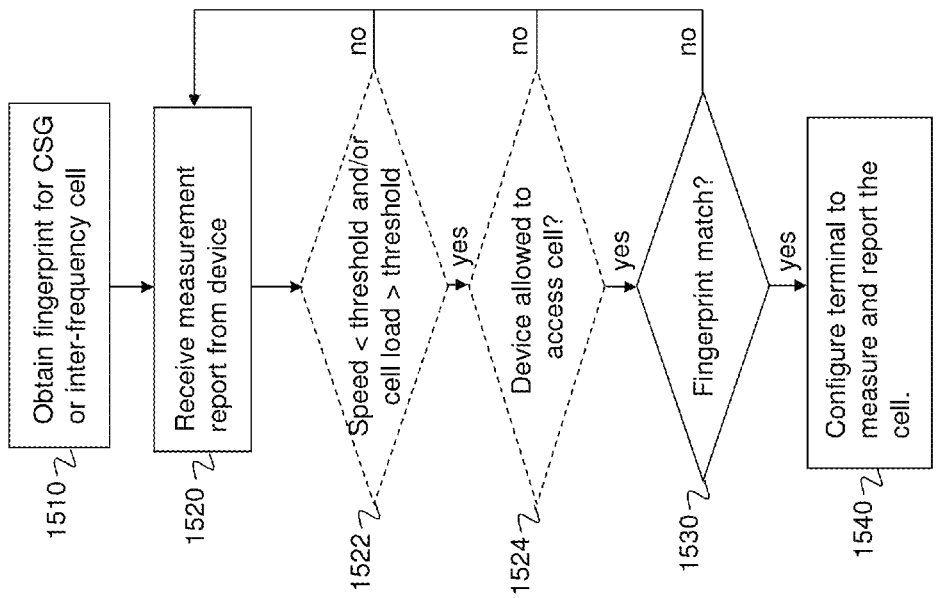

Yet further, steps 1550-1570, described in conjunction with FIG. 15*b*, may also be applied in this example in order to stop measuring and reporting when the wireless device 1300 is no longer close to cell 1210.

Figure 16A:
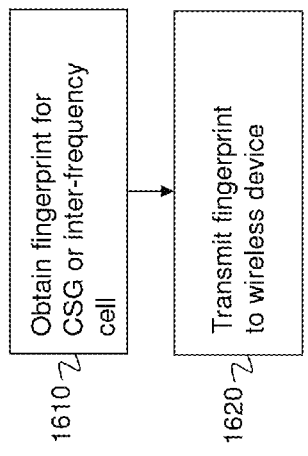
FIGS. 16a-c are flow charts illustrating methods in a network node according to some embodiments.

With reference to FIG. 12 and the flowchart in FIG. 16*a*, an example method in a network node 1400*a* for proximity detection will now be described. The network node 1400*a* is comprised in wireless communications network 1200, and serves the wireless device 1300.

According to the method, the network node 1400*a* obtains 1610 a fingerprint of cell 1210, which is a CSG cell or an inter-frequency cell. This step corresponds to step 1510 above, and the same variations apply.

However, instead of checking the fingerprint itself, in this example the network node 1400*a* transmits 1620 the fingerprint to the wireless device 1300, thereby enabling the wireless device 1300 to determine when it is in the proximity of the cell 1210.

Figure 16C:
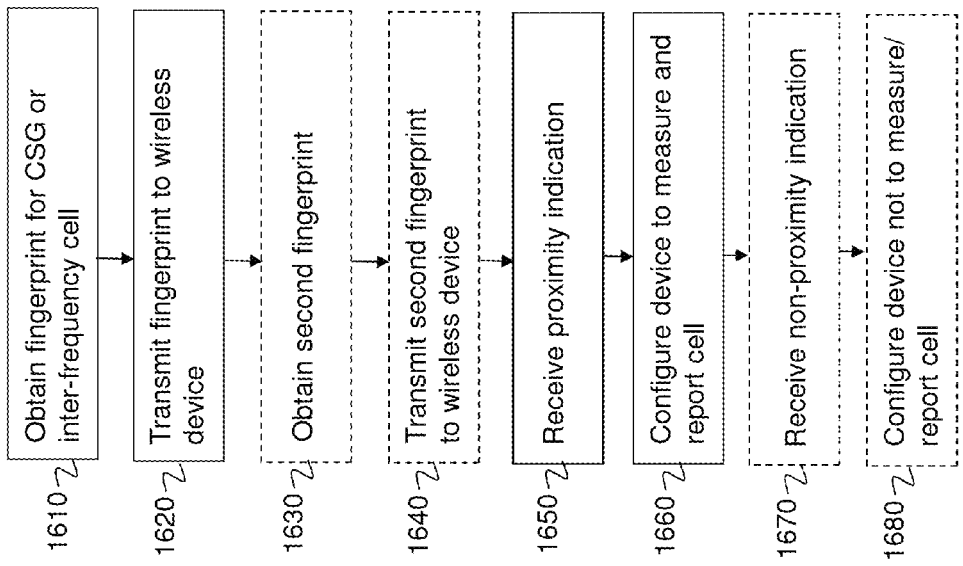
Figure 16B:
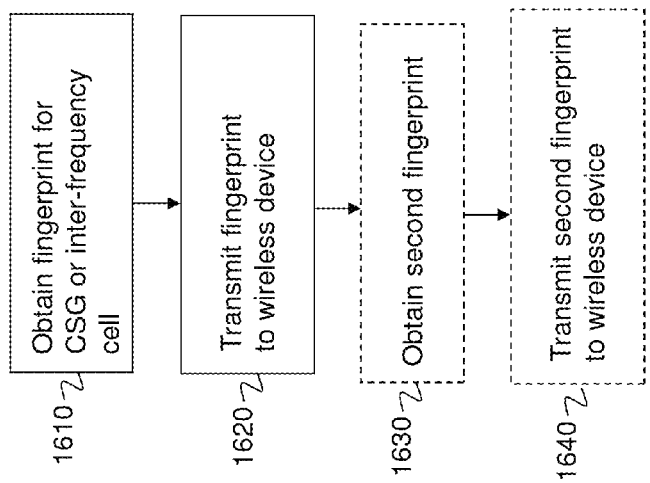

Optionally, as shown in FIGS. 16b-c, the network node 1400a also obtains 1630 a second fingerprint, corresponding to an area outside the cell 1210. This may be done in any of the ways described above. The network node 1400a transmits 1640 the second fingerprint to the wireless device 1300, thereby enabling the wireless device 1300 to determine when it is no longer in the proximity of the cell 1210. The network node 1400a may then receive 1670 an indication that the wireless device 1300 is no longer in the proximity of cell 1210, and accordingly configures 1680 wireless device 1300 to stop measuring and reporting cell 1210. Alternatively, the wireless device 1300 configures itself to stop measuring and reporting cell 1210.

In some variants, as shown in FIG. 16c, the network node 1400a receives 1650 an indication from the wireless device 1300 that it is in the proximity of the cell 1210. Responsive to the indication, network node 1400a configures 1660 the wireless device to perform and report measurements on the cell. This step corresponds to step 1540 above, and the same variations apply here as well.

However, in other variants the wireless device 1300 does not send a proximity indication, but configures itself to start measuring and reporting the cell 1210, as will be explained below.

The fingerprint, and/or the second fingerprint if applicable, may optionally be transmitted to a second network node.

Figures 17, 18A:
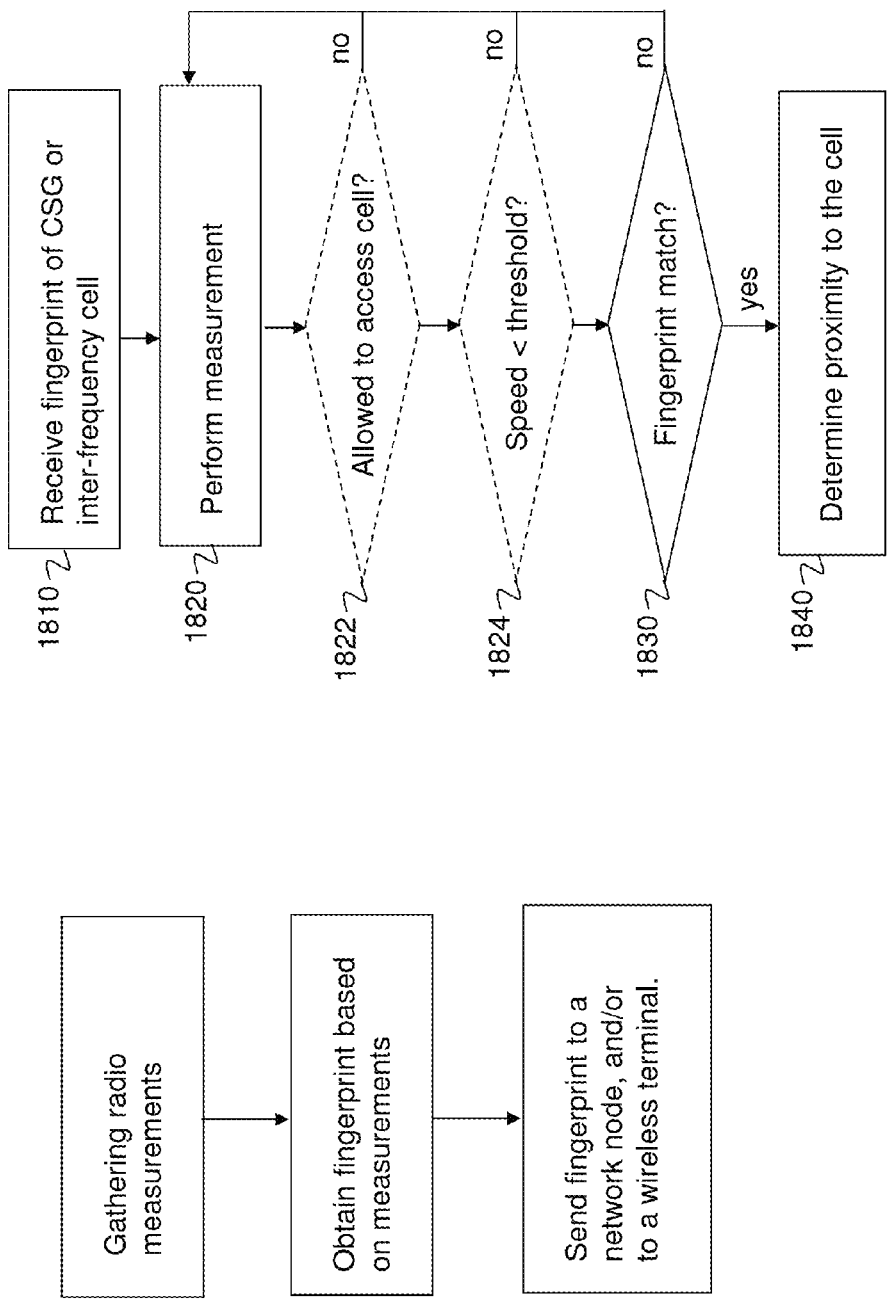
FIG. 17 is a flow chart illustrating a method in a home base station according to some embodiments.
FIGS. 18a-c are flow charts illustrating methods in a wireless device according to some embodiments.

Referring now to FIG. 17, a method in a base station, for obtaining a fingerprint for a cell is provided. The base station may be a LPN such as an inter-frequency pico base station or home base station. Thus, in particular embodiments the cell is an LPN cell or a CSG cell. The base station gathers radio measurements from one or more wireless terminals served by it. The measurements could for instance comprise measurement reports received from the wireless terminals, or the base station may perform measurements on signals received from one or more wireless terminals. In one variant, measurements are gathered from wireless terminals that have recently been handed over to, or are about to be handed over from the cell. Alternatively or additionally, measurements may be gathered from wireless terminals which have not recently been handed over to the cell, and are not about to be handed over from the cell.

The base station then obtains a fingerprint for the served cell based on the measurements. The fingerprint may be obtained in any of the ways described above in connection with FIG. 15. The base station then sends the fingerprint to a network node, e.g. a neighboring eNodeB or NodeB, or to an O&M node. Alternatively or additionally, the base station may send the fingerprint to a wireless terminal served by it, thereby allowing that wireless terminal to determine when it is in the proximity of the cell.

Referring now to FIG. 12 and the flowchart in FIG. 18, some embodiments provide a method in a wireless device 1300 for proximity detection. The wireless device 1300 is served by a network node 1400a and comprised in a wireless communications network 1200.

The wireless device 1300 receives 1810 a fingerprint of a cell 1210 from network node 1400a. The cell 1210 may be a CSG cell or an inter-frequency cell The wireless device 1300 then performs 1820 one or more measurements, e.g. measures the signal strengths of neighboring cells 1204 and 1206. The signal strength of serving cell 1202 may also be measured.

The measurement or measurements are compared to the fingerprint, and responsive to determining 1830 that there is a match, the wireless device determines 1840 that it is in proximity of the cell 1210.

In a variant of this embodiment, shown in FIG. 18b, the wireless device 1300 checks its own speed, and only proceeds to the fingerprint check in response to determining 1824 that the speed is below a preconfigured threshold speed.

In a particular variant, the cell 1210 is a CSG cell. The wireless device 1300 may then also determine whether it is allowed to access the CSG cell, e.g. by checking if the CSG id of cell 1210 is in the whitelist of the device 1300. The fingerprint check is only performed in response to determining 1822 that the wireless device 1300 is allowed to access the CSG cell.

It should be noted that, in different variants, either one of, or both of steps 1822 and 1824 may be performed. Furthermore, the order of steps 1822 and 1824 is interchangeable.

Figure 18C:
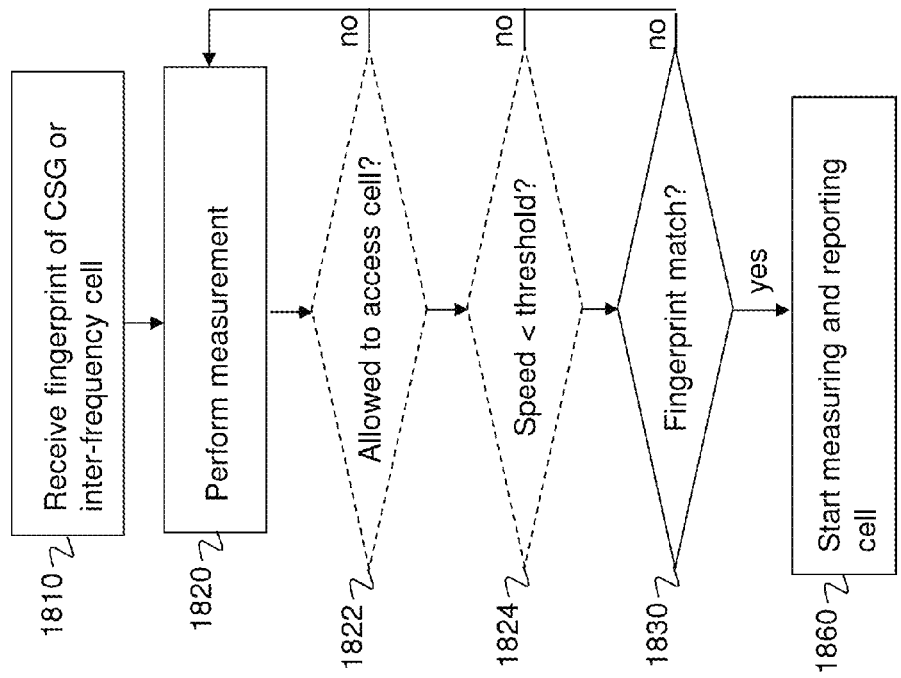
Figure 18B:
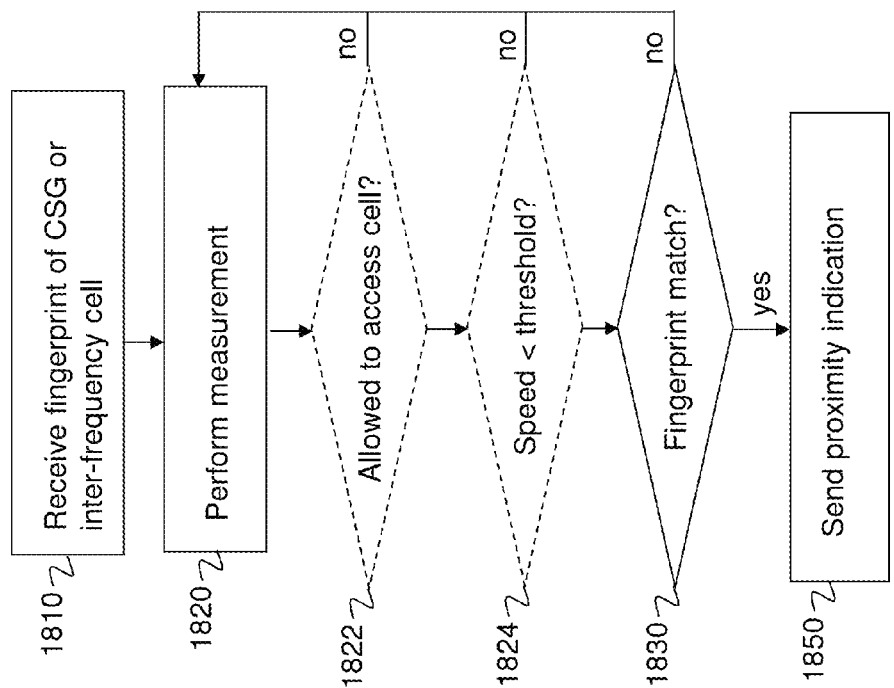

In the example of FIG. 18b, the wireless device also sends 1850 an indication to the network node 1400a that the wireless device 1300 is in proximity of the cell 1210. In response, the network node 1400a may configure the device 1300 to start measuring and reporting the cell 1210.

FIG. 18c illustrates a further embodiment, based on either one of the embodiments shown in FIGS. 18a and 18b. In this example, the wireless device 1300 does not send a proximity indication. Instead, in response to determining 1830 that the measurement matches the fingerprint, the device 1300 starts to send reports 1860 for cell 1210, if it is a CSG cell, for example by removing the cell identity from its blacklist. Alternatively, wireless device 1300 starts performing measurements 1860 on the frequency assigned to the cell 1210, if it is an inter-frequency cell.

In any of the examples shown in FIGS. 18a-c, the wireless device 1300 may optionally receive a second fingerprint, corresponding to an area outside the cell. If a second measurement matches the second fingerprint, the wireless device 1300 sends a "non-proximity" indication, i.e. sends an indication to network node 1400a that it is no longer in the vicinity of cell 1210. Alternatively, wireless device 1300 stops performing measurements on the cell 1210 if it is an inter-frequency cell, or stops reporting measurements on the cell 1210 if it is a CSG cell.

As another option, the wireless device 1300 may stop measuring and/or reporting the cell 1210 in response to receiving a second measurement, which does not match the first fingerprint.

Some example implementations of the methods illustrated above will now be described. Although the described solutions may be implemented in any appropriate type of telecommunication system supporting any suitable communication standards and using any suitable components, particular embodiments of the described solutions may be implemented in a heterogeneous LTE network such as that illustrated in FIG. 12.

As shown in FIG. 12, the example network may include one or more instances of user equipment (UEs), one or more macro base stations (eNBs) capable of communicating with these UEs, and one or more Low Power Nodes (LPNs) capable of communicating with the UEs, along with any additional elements suitable to support communication between UEs or between a UE and another communication device (such as a landline telephone). Although the illustrated UEs may represent communication devices that include any suitable combination of hardware and/or software, these UEs may, in particular embodiments, represent devices such as the example UE illustrated in greater detail by FIG. 13. Similarly, although the illustrated base stations may represent network nodes that include any suitable combination of hardware and/or software, these base stations may, in particular embodiments, represent devices such as the example base station illustrated in greater detail by FIG. 14.

Figure 13:
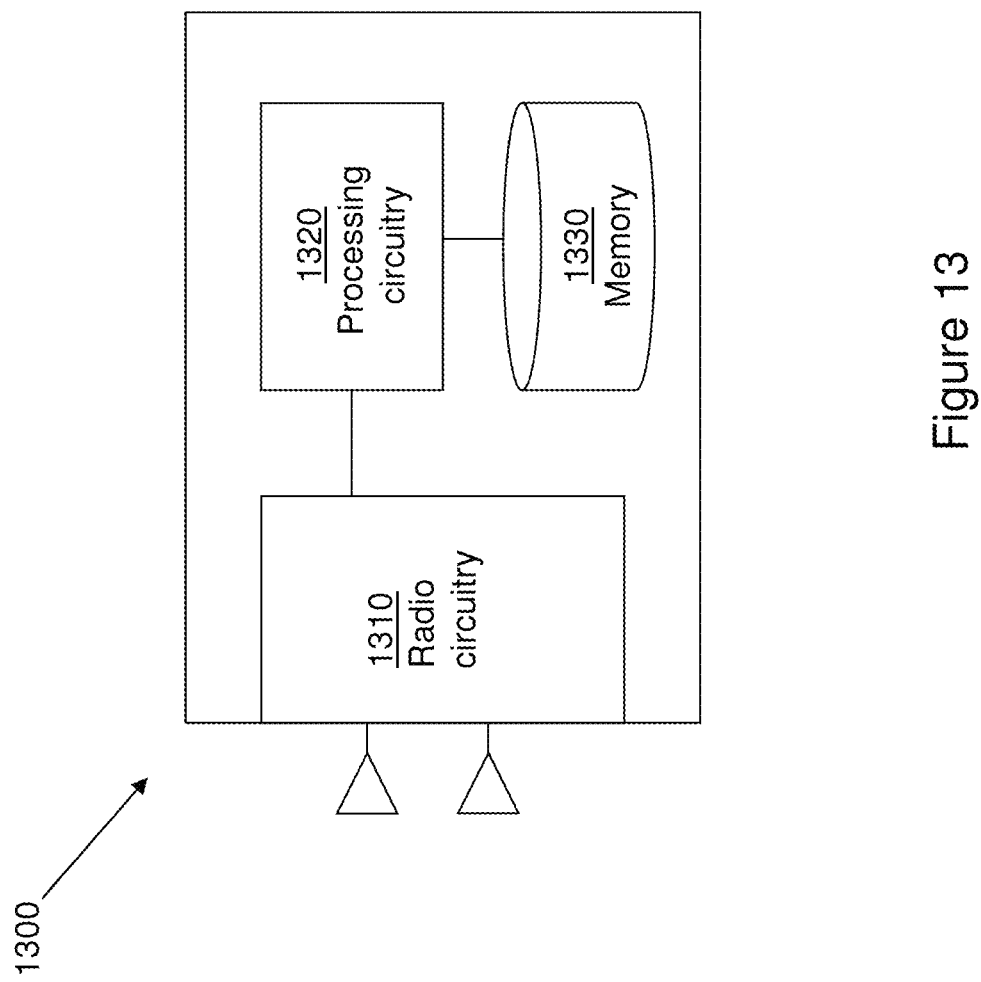
FIG. 13 is a block diagram illustrating a wireless device according to some embodiments.

As shown in FIG. 13, the example UE 1300 includes processing circuitry 1320, a memory 1330, radio circuitry 1310, and one or more antennas. In particular embodiments, some or all of the functionality described above as being provided by mobile communication devices or other forms of UE may be provided by the UE processing circuitry executing instructions stored on a computer-readable medium, such as the memory shown in FIG. 13. Alternative embodiments of the UE may include additional components beyond those shown in FIG. 13 that may be responsible for providing certain aspects of the UE's functionality, including any of the functionality described above and/or any functionality necessary to support the solution described above.

In some embodiments, the processing circuitry 1320 is configured to receive, via the radio circuitry 1310, a fingerprint of a CSG cell, or of an inter-frequency cell, from the network node. The processing circuitry 1320 is further configured to perform a measurement, and, responsive to determining that the measurement matches the fingerprint, determine that the wireless device is in proximity of the cell.

Figure 14:
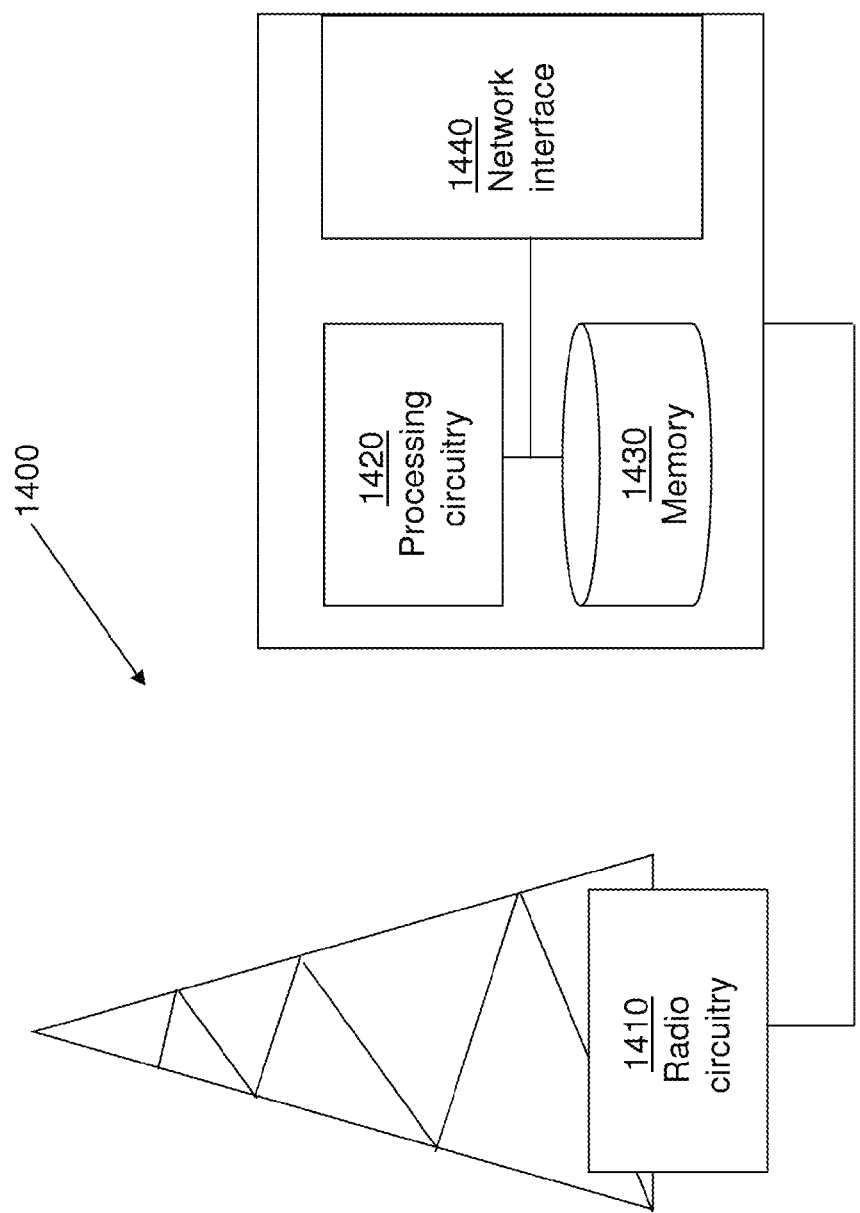
FIG. 14 is a block diagram illustrating a network node according to some embodiments.

As shown in FIG. 14, the example network node 1400, which may be a macro base station (e.g. an eNodeB), a Low power node (LPN) or an O&M node, includes processing circuitry 1420, a memory 1430, radio circuitry 1410, and one or more antennas. In particular embodiments, some or all of the functionality described above as being provided by a mobile base station, a base station controller, a NodeB, an enhanced node B (eNB), and/or any other type of mobile communications node may be provided by the base station processing circuitry executing instructions stored on a computer-readable medium, such as the memory shown in FIG. 14. Alternative embodiments of the base station may include additional components responsible for providing additional functionality, including any of the functionality identified above and/or any functionality necessary to support the solution described above.

In some embodiments, the processing circuitry 1420 is configured to obtain a fingerprint of a CSG cell or an inter-frequency cell. The processing circuitry 1420 is further configured to transmit, via the radio circuitry 1410, the fingerprint to the wireless device, thereby enabling the wireless device to determine when it is in the proximity of the cell.

In other embodiments, the processing circuitry 1420 is configured to obtain a fingerprint of a CSG cell or an inter-frequency cell. The processing circuitry 1420 is further configured to receive, via the radio circuitry 1410, a measurement report from the wireless device, and, responsive to determining that the measurement report matches the fingerprint, configure the wireless device to perform measurements on the cell.

The processing circuitry 1320, 1420 may be implemented as one or more digital processing circuits (e.g., microprocessors, ASICs, DSPs, etc.). The processing circuitry may include a control processor, which comprises fixed or programmed circuitry, or some combination thereof, and which is configured to take signaling-related decisions. In one embodiment, the control processor is a microprocessor-based circuit that is configured according to its execution of computer program instructions stored in memory or another computer-readable media in or associated with the depicted network node or wireless device. In any case, the control processor in one or more embodiments coordinates with signaling circuitry (e.g., circuitry implementing signaling timing, protocol stacks, etc.) and one or more communication interfaces, to send and receive signaling to and from the network node or wireless device.

The radio circuitry 1310, 1410 may be embodied by a cellular modem for wirelessly communicating with another network node, or with a wireless device, according to defined air interface protocols.

When using the word "comprise" or "comprising" it shall be interpreted as non-limiting, i.e. meaning "consist at least of".

The present invention is not limited to the above-describe preferred embodiments. Various alternatives, modifications and equivalents may be used. Therefore, the above embodiments should not be taken as limiting the scope of the invention It should be noted that although terminology from 3GPP LTE has been used in this disclosure to exemplify the invention, this should not be seen as limiting the scope of the invention to only the aforementioned system. Other wireless systems, including UMTS, may also benefit from exploiting the ideas covered within this disclosure.

Various examples set forth above are focused on detecting proximity to LPN or CSG cells. It is emphasized, however, that the concepts presented here are generally applicable to proximity detection of other types of cells. In particular, the presented methods and devices may advantageously be applied for proximity detection of any CSG cell (e.g. a non-LPN cell operating in closed access mode) or any inter-frequency cell.

The disclosed methods and devices could reduce the need for inter-frequency measurements in general, and thereby improve performance, since a wireless device would only need to perform inter-frequency measurements when there is a fingerprint match.

What is claimed is:

1. A method in a network node for enabling proximity detection, the network node being comprised in a wireless communications network and the network node serving a wireless device, the method comprising:
   obtaining a fingerprint of a CSG cell, or of an inter-frequency cell; and
   transmitting the fingerprint to the wireless device, thereby enabling the wireless device to determine when it is in the proximity of the cell.

2. The method of claim 1, comprising the further steps of:
   obtaining a second fingerprint, corresponding to an area outside the cell;
   transmitting the second fingerprint to the wireless device, thereby enabling the wireless device to determine when it is no longer in the proximity of the cell.

3. The method of claim 1, further comprising receiving an indication from the wireless device that it is in the proximity of the cell, and, responsive to the indication, configuring the wireless device to perform and report measurements on the cell.

4. The method of claim 1, further comprising sending the fingerprint to a second network node.

5. The method of claim 1, wherein the fingerprint comprises a set of measurement values which are characteristic for a region in the vicinity of the cell.

6. The method of claim 1, wherein the step of obtaining a fingerprint comprises gathering measurement reports from at least one wireless device served by the network node.

7. The method of claim 6, comprising gathering measurement reports from wireless devices in conjunction with handover of a wireless device to or from the cell.

8. The method of claim 1, wherein obtaining the fingerprint comprises consolidating two or more measurement reports or fingerprints for the cell into a single fingerprint.

9. The method of claim 8, further comprising taking an average of values from the measurement reports to obtain the fingerprint.

10. The method of claim 8, further comprising obtaining the fingerprint by deriving one or more signal strength ranges from the measurement reports, each signal strength range corresponding to a cell.

11. The method of claim 8, wherein one or more of the consolidated fingerprints are received from another network node.

12. The method of claim 8, wherein obtaining the fingerprint further comprises:
   obtaining a location corresponding to each gathered measurement report;
   consolidating two or more of the gathered measurement reports into a fingerprint; and
   associating the consolidated fingerprint with an area defined by the locations corresponding to the measurement reports included in the fingerprint.

13. The method of claim 12, wherein the location corresponding to a measurement report is obtained in one or more of the following ways: measuring the angle-of arrival and timing advance of the wireless device from which the measurement report is gathered, obtaining a GPS location of the wireless device from which the measurement report is gathered, obtaining a positioning measurement for the wireless device from which the measurement report is gathered.

14. The method of claim 8, wherein the fingerprint is received from the network node serving the cell, or from an O&M node.

15. A method in a network node for proximity detection, the network node being comprised in a wireless communications network and the network node serving a wireless device, the method comprising:
   obtaining a fingerprint of a CSG cell or an inter-frequency cell;
   receiving a measurement report from the wireless device;
   responsive to determining that the measurement report matches the fingerprint, configuring the wireless device to perform and report measurements on the cell.

16. The method of claim 15, wherein the determining and configuring steps are further performed in response to determining that the speed of the wireless device is below a preconfigured threshold speed, or that the load of the cell exceeds a preconfigured threshold load, or both.

17. The method of claim 15, wherein the cell is a CSG cell, and the determining and configuring steps are further performed in response to determining that the wireless device is allowed to access at least one neighboring CSG cell.

18. The method of claim 15, comprising the further step of receiving a second measurement report from the wireless device, and, responsive to determining that the second measurement report does not match the fingerprint, configuring the wireless device to stop performing and reporting measurements on the cell, by either instructing it to add the PCI of the cell into the blacklist, or removing the frequency assigned to the cell from the allowed measurement frequencies.

19. The method of claim 15, comprising the further steps of:
   obtaining a second fingerprint, corresponding to an area outside the cell;
   receiving a second measurement report from the wireless device;
   responsive to determining that the second measurement report matches the second fingerprint, configuring the wireless device to stop performing and reporting measurements on the cell.

20. The method of claim 15, wherein the configuring step comprises instructing the wireless device to remove a physical cell identity (PCI) of the cell from a blacklist.

21. The method of claim 15, wherein the configuring step comprises instructing the wireless device to perform measurements on a frequency assigned to the cell.

22. The method of claim 15, further comprising sending the fingerprint to a second network node.

23. The method of claim 15, wherein the fingerprint comprises a set of measurement values which are characteristic for a region in the vicinity of the cell.

24. The method of claim 15, wherein the step of obtaining a fingerprint comprises gathering measurement reports from at least one wireless device served by the network node.

25. The method of claim 24, comprising gathering measurement reports from wireless devices in conjunction with handover of a wireless device to or from the cell.

26. The method of claim 15, wherein obtaining the fingerprint comprises consolidating two or more measurement reports or fingerprints for the cell into a single fingerprint.

27. The method of claim 26, further comprising taking an average of values from the measurement reports to obtain the fingerprint.

28. The method of claim 26, further comprising obtaining the fingerprint by deriving one or more signal strength ranges from the measurement reports, each signal strength range corresponding to a cell.

29. The method of claim 26, wherein the fingerprint is received from the network node serving the cell, or from an O&M node.

30. The method of claim 15, wherein one or more of the consolidated fingerprints are received from another network node.

31. The method of claim 15, wherein obtaining the fingerprint further comprises:
   obtaining a location corresponding to each gathered measurement report;
   consolidating two or more of the gathered measurement reports into a fingerprint; and
   associating the consolidated fingerprint with an area defined by the locations corresponding to the measurement reports included in the fingerprint.

32. The method of claim 31, wherein the location corresponding to a measurement report is obtained in one or more of the following ways: measuring the angle-of arrival and timing advance of the wireless device from which the measurement report is gathered, obtaining a GPS location of the wireless device from which the measurement report is gathered, obtaining a positioning measurement for the wireless device from which the measurement report is gathered.

33. A method in a wireless device for proximity detection, the wireless device being served by a network node and comprised in a wireless communications network, the method comprising:
   receiving a fingerprint of a CSG cell, or of an inter-frequency cell, from the network node;
   performing one or more measurements;
   responsive to determining that the measurements match the fingerprint, determining that the wireless device is in proximity of the cell.

34. The method of claim 33, further comprising determining whether the measurements match the fingerprint in response to determining that the speed of the wireless device is below a preconfigured threshold speed.

35. The method of claim 33, wherein the cell is a CSG cell, the method further comprising determining whether the measurements match the fingerprint in response to determining that the wireless device is allowed to access the CSG cell.

36. The method of claim 33, further comprising, responsive to determining that the measurements match the fingerprint, sending an indication to the network node that the wireless device is in proximity of the cell.

37. The method of claim 33, wherein the cell is an inter-frequency cell, the method further comprising, responsive to determining that the measurements match the fingerprint, starting to perform measurements on the frequency assigned to the cell.

38. The method of claim 33, wherein the cell is a CSG cell, the method further comprising, responsive to determining that the measurements match the fingerprint, starting to report measurements for the CSG cell.

39. The method of claim 33, comprising the further steps of:
   receiving a second fingerprint, corresponding to an area outside the cell;
   performing one or more second measurements; and
   responsive to determining that the one or more second measurements match the second fingerprint, stop performing measurements on the cell if it is an inter-frequency cell, or stop reporting measurements on the cell if it is a CSG cell.

40. The method of claim 33, comprising the further steps of:
   receiving a second fingerprint, corresponding to an area outside the cell;
   performing one or more second measurements; and
   responsive to determining that the second measurements match the second fingerprint, sending an indication to the network node that the wireless device is not in proximity of the cell.

41. The method of claim 33, wherein the fingerprint comprises a set of measurement values which are characteristic for a region in the vicinity of the CSG cell.

42. The method of claim 33, wherein the network node is an eNB, the wireless device is a user equipment, and the wireless communications network is an LTE network.

43. A network node comprising radio circuitry and processing circuitry, the network node being configured to serve a wireless device, the processing circuitry being configured to:
   obtain a fingerprint of a CSG cell or an inter-frequency cell; and
   transmit, via the radio circuitry, the fingerprint to the wireless device, thereby enabling the wireless device to determine when it is in the proximity of the cell.

44. A network node comprising radio circuitry and processing circuitry, the network node being configured to serve a wireless device, the processing circuitry being configured to:
   obtain a fingerprint of a CSG cell or an inter-frequency cell;
   receive, via the radio circuitry, a measurement report from the wireless device; and
   responsive to determining that the measurement report matches the fingerprint, configure the wireless device to perform measurements on the cell.

45. A wireless device comprising radio circuitry and processing circuitry, the processing circuitry being configured to:
   receive, via the radio circuitry, a fingerprint of a CSG cell, or of an inter-frequency cell, from the network node;
   perform one or more measurements; and
   responsive to determining that the measurements match the fingerprint, determine that the wireless device is in proximity of the cell.

* * * * *

UNITED STATES PATENT AND TRADEMARK OFFICE
CERTIFICATE OF CORRECTION

| | |
|---|---|
| PATENT NO. | : 9,042,918 B2 |
| APPLICATION NO. | : 13/428886 |
| DATED | : May 26, 2015 |
| INVENTOR(S) | : Teyeb et al. |

It is certified that error appears in the above-identified patent and that said Letters Patent is hereby corrected as shown below:

In the specification

Column 14, Line 36, delete "Si interface" and insert -- S1 interface --, therefor.

Column 14, Line 59, delete "CSG)" and insert -- CSG). --, therefor.

Column 19, Line 46, delete "network node 1300" and insert -- network node --, therefor.

Column 21, Line 59, delete "cell" and insert -- cell. --, therefor.

Column 24, Lines 14-15, delete "invention" and insert -- invention. --, therefor.

Signed and Sealed this
Fifth Day of April, 2016

Michelle K. Lee
*Director of the United States Patent and Trademark Office*